(12) United States Patent
Wallace et al.

(10) Patent No.: US 7,978,778 B2
(45) Date of Patent: Jul. 12, 2011

(54) RECEIVER STRUCTURES FOR SPATIAL SPREADING WITH SPACE-TIME OR SPACE-FREQUENCY TRANSMIT DIVERSITY

(75) Inventors: Mark S. Wallace, Bedford, MA (US); Irina Medvedev, Somerville, MA (US); Jay Rodney Walton, Carlisle, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 1039 days.

(21) Appl. No.: 11/042,126

(22) Filed: Jan. 24, 2005

(65) Prior Publication Data

US 2006/0050770 A1 Mar. 9, 2006

Related U.S. Application Data

(60) Provisional application No. 60/608,226, filed on Sep. 8, 2004, provisional application No. 60/607,371, filed on Sep. 3, 2004.

(51) Int. Cl.
*H04B 7/02* (2006.01)
*H04B 7/216* (2006.01)

(52) U.S. Cl. ........................................ 375/267; 370/335

(58) Field of Classification Search .................. 375/267, 375/347, 346, 350, 349, 130, 148; 370/335, 370/343, 441
See application file for complete search history.

(56) References Cited

U.S. PATENT DOCUMENTS

| 5,581,583 | A | 12/1996 | Conti et al. |
| 5,668,837 | A | 9/1997 | Dent |
| 5,757,845 | A | 5/1998 | Fukawa et al. |
| 6,144,711 | A | 11/2000 | Raleigh et al. |

(Continued)

FOREIGN PATENT DOCUMENTS

CN 1476695 A 2/2004

(Continued)

OTHER PUBLICATIONS

Dammann et al, "Beamforming in Combination with Space-Time Diversity for Broadband OFDM Systems", ICC 2002. 2002 IEEE International Conference on Communications. Conference Proceeding. New York, NY, Apr. 28-May 2, 2002, IEEE International Conference on Communications, New York, NY: IEEE, US, vol. vol. 1 of 5, (Apr. 28, 2002), pp. 165-171.

(Continued)

*Primary Examiner* — Khai Tran
(74) *Attorney, Agent, or Firm* — QUALCOMM Patent Group; Thien T. Nguyen; James H. Yancey, Jr.

(57) ABSTRACT

A receiving entity obtains received symbols for a data transmission having at least one data symbol stream sent with space-time transmit diversity (STTD). The receiving entity derives an overall channel response matrix in accordance with the STTD encoding scheme used for the data transmission, derives a spatial filter matrix based on the overall channel response matrix, and performs spatial matched filtering on a vector of received symbols for each 2-symbol interval to obtain a vector of detected symbols for the 2-symbol interval. The receiving entity may perform post-processing (e.g., conjugation) on the detected symbols if needed. Alternatively, the receiving entity derives a spatial filter matrix based on an effective channel response matrix, performs spatial matched filtering on the received symbols for each symbol period to obtain detected symbols for that symbol period, and combines multiple estimates obtained for each data symbol sent with STTD.

52 Claims, 5 Drawing Sheets

U.S. PATENT DOCUMENTS

| | | |
|---|---|---|
| 6,175,743 B1 | 1/2001 | Alperovich et al. |
| 6,198,775 B1 | 3/2001 | Khayrallah et al. |
| 6,218,985 B1 | 4/2001 | Adams |
| 6,298,035 B1 | 10/2001 | Heiskala |
| 6,314,147 B1 | 11/2001 | Liang et al. |
| 6,351,499 B1 | 2/2002 | Paulraj et al. |
| 6,441,786 B1 | 8/2002 | Jasper et al. |
| 6,452,981 B1 | 9/2002 | Raleigh et al. |
| 6,473,467 B1 | 10/2002 | Wallace et al. |
| 6,477,161 B1 | 11/2002 | Hudson et al. |
| 6,486,828 B1 | 11/2002 | Cahn et al. |
| 6,496,535 B2 | 12/2002 | Xu |
| 6,542,556 B1 | 4/2003 | Kuchi et al. ............... 375/299 |
| 6,618,454 B1 | 9/2003 | Agrawal et al. |
| 6,642,888 B2 | 11/2003 | Kishigami et al. |
| 6,678,263 B1 | 1/2004 | Hammons, Jr. et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,788,661 B1 | 9/2004 | Ylitalo et al. |
| 6,801,790 B2 | 10/2004 | Rudrapatna |
| 6,804,307 B1 | 10/2004 | Popovic |
| 6,816,555 B2 | 11/2004 | Sakoda |
| 6,842,487 B1 | 1/2005 | Larsson |
| 6,847,306 B1 | 1/2005 | Diba et al. |
| 6,862,271 B2 | 3/2005 | Medvedev et al. |
| 6,937,189 B2 | 8/2005 | Kim |
| 6,940,917 B2 | 9/2005 | Menon et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,020,110 B2 | 3/2006 | Walton et al. |
| 7,020,490 B2 | 3/2006 | Khatri |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,156 B1 | 6/2006 | Kuchi |
| 7,079,972 B2 | 7/2006 | Vaidyanathan |
| 7,095,987 B2 | 8/2006 | Brothers, Jr. et al. |
| 7,099,678 B2 | 8/2006 | Vaidyanathan |
| 7,099,698 B2 | 8/2006 | Tarokh et al. |
| 7,110,378 B2 | 9/2006 | Onggosanusi et al. |
| 7,110,463 B2 | 9/2006 | Wallace et al. |
| 7,130,580 B2 | 10/2006 | Alexiou et al. |
| 7,149,254 B2 | 12/2006 | Sampath |
| 7,151,809 B2 | 12/2006 | Ketchum et al. |
| 7,190,734 B2 | 3/2007 | Giannakis et al. |
| 7,194,042 B2 | 3/2007 | Walton et al. |
| 7,200,631 B2 | 4/2007 | Mailaender et al. |
| 7,227,906 B2 | 6/2007 | Fukuda et al. |
| 7,292,623 B2 * | 11/2007 | Reznik ............... 375/148 |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,798 B2 | 2/2008 | Won |
| 7,336,746 B2 | 2/2008 | Walton et al. |
| 7,356,073 B2 | 4/2008 | Heikkila |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,529,177 B2 | 5/2009 | Celebi et al. |
| 7,583,747 B1 | 9/2009 | Damen et al. |
| 7,593,317 B2 | 9/2009 | Yuda et al. |
| 2002/0034217 A1 | 3/2002 | Zhang et al. |
| 2002/0172264 A1 | 11/2002 | Wiberg et al. |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0016637 A1 | 1/2003 | Khayrallah et al. |
| 2003/0043929 A1 | 3/2003 | Sampath |
| 2003/0072254 A1 | 4/2003 | Ma et al. |
| 2003/0073464 A1 | 4/2003 | Giannakis et al. |
| 2003/0112745 A1 | 6/2003 | Zhuang et al. |
| 2003/0123567 A1 | 7/2003 | Shigemasa et al. |
| 2003/0186698 A1 | 10/2003 | Holma et al. |
| 2003/0228850 A1 | 12/2003 | Hwang |
| 2004/0002364 A1 | 1/2004 | Tirkkonen et al. |
| 2004/0008126 A1 | 1/2004 | Diba et al. |
| 2004/0042439 A1 | 3/2004 | Menon et al. |
| 2004/0048584 A1 | 3/2004 | Vaidyanathan et al. |
| 2004/0052315 A1 | 3/2004 | Thielecke et al. |
| 2004/0081263 A1 | 4/2004 | Lee et al. |
| 2004/0082356 A1 | 4/2004 | Walton et al. ............... 455/522 |
| 2004/0085939 A1 | 5/2004 | Wallace et al. |
| 2004/0136349 A1 | 7/2004 | Walton et al. |
| 2004/0146014 A1 | 7/2004 | Hammons, Jr. et al. |
| 2004/0146018 A1 | 7/2004 | Walton et al. ............... 370/329 |
| 2005/0002440 A1 | 1/2005 | Alamouti et al. |
| 2005/0017511 A1 | 1/2005 | Dalton |
| 2005/0026570 A1 | 2/2005 | Han |
| 2005/0149320 A1 | 7/2005 | Kajala et al. |
| 2005/0175115 A1 | 8/2005 | Walton et al. |
| 2005/0180312 A1 | 8/2005 | Walton et al. |
| 2005/0195733 A1 | 9/2005 | Walton et al. |
| 2005/0238111 A1 | 10/2005 | Wallace et al. |
| 2005/0249159 A1 | 11/2005 | Abraham et al. |
| 2005/0249174 A1 | 11/2005 | Lundby et al. |
| 2005/0265275 A1* | 12/2005 | Howard et al. ............... 370/328 |
| 2005/0276347 A1 | 12/2005 | Mujtaba et al. |
| 2006/0013250 A1 | 1/2006 | Howard et al. |
| 2006/0067421 A1 | 3/2006 | Rodney et al. |
| 2006/0234789 A1 | 10/2006 | Tarokh et al. |
| 2006/0274844 A1 | 12/2006 | Walton et al. |
| 2007/0009059 A1 | 1/2007 | Wallace et al. |
| 2008/0031372 A1 | 2/2008 | Walton et al. |
| 2008/0031374 A1 | 2/2008 | Walton et al. |
| 2008/0095282 A1 | 4/2008 | Walton et al. |
| 2008/0273617 A1 | 11/2008 | Lundby et al. |

FOREIGN PATENT DOCUMENTS

| | | |
|---|---|---|
| EP | 0752793 | 1/1997 |
| EP | 0905920 | 3/1999 |
| EP | 1009124 | 6/2000 |
| EP | 1073214 A1 | 1/2001 |
| EP | 1185001 | 3/2002 |
| EP | 1220506 A1 | 7/2002 |
| EP | 1223702 | 7/2002 |
| EP | 1241824 | 9/2002 |
| EP | 1361686 | 11/2003 |
| EP | 1396956 A1 | 3/2004 |
| JP | 11205026 A | 7/1999 |
| JP | 2002503048 T | 1/2002 |
| JP | 2002524972 T | 8/2002 |
| JP | 2003530010 T | 10/2003 |
| JP | 2004023416 A | 1/2004 |
| JP | 2004064654 A | 2/2004 |
| JP | 2004072150 A | 3/2004 |
| JP | 2004096753 A | 3/2004 |
| JP | 2004104790 A | 4/2004 |
| JP | 2005524331 T | 8/2005 |
| JP | 2006545423 | 6/2007 |
| JP | 2007515829 T | 6/2007 |
| JP | 2007523549 T | 8/2007 |
| JP | 2007523550 T | 8/2007 |
| JP | 2006545774 | 9/2007 |
| JP | 2007529972 T | 10/2007 |
| JP | 2007538414 T | 12/2007 |
| KR | 2002-60860 | 7/2002 |
| KR | 1020060123496 | 12/2006 |
| RU | 2111619 | 5/1998 |
| RU | 2116698 C1 | 7/1998 |
| RU | 2202152 | 1/2000 |
| WO | WO9737456 A2 | 10/1997 |
| WO | 0156218 | 8/2001 |
| WO | WO0176110 A2 | 10/2001 |
| WO | 0225857 | 3/2002 |
| WO | WO02078211 A2 | 10/2002 |
| WO | WO03015334 A1 | 2/2003 |
| WO | WO03041300 | 5/2003 |
| WO | 03050968 | 6/2003 |
| WO | 03056742 | 7/2003 |
| WO | WO03058871 A1 | 7/2003 |

| | | |
|---|---|---|
| WO | WO03063526 A1 | 7/2003 |
| WO | 03071711 | 8/2003 |
| WO | WO03094386 A1 | 11/2003 |
| WO | 03101029 | 12/2003 |
| WO | 2004002011 | 12/2003 |
| WO | WO2004002047 | 12/2003 |
| WO | WO2004021605 A1 | 3/2004 |
| WO | 2004038987 | 5/2004 |
| WO | WO2004038984 A2 | 5/2004 |
| WO | WO2004038985 A2 | 5/2004 |
| WO | WO2004039011 A2 | 5/2004 |
| WO | 2005060192 | 6/2005 |
| WO | WO2005099211 A1 | 10/2005 |

OTHER PUBLICATIONS

International Search Report—PCT/US2005/031450, International Search Authority—European Patent Office—Jan. 16, 2006.
International Preliminary Examination Report— PCT/US2005/031450, International Search Authority—IPEA/US—Jul. 5, 2007.
Written Opinion—PCT/US2005/031450, International Search Authority—European Patent Office—Jan. 16, 2006.
Agustin A et al: "LDC Construction with a Defined Structure [MIMO Linear Dispersive Codes]" Vehicular Technology Conference, 2003. VTC 2003-Fall. 2003 IEEE 58th Orlando, FL, USA Oct. 6-9, 2003, Piscataway, NJ, USA, IEEE, US, Oct. 6, 2003, pp. 433-437.
Alamouti, Siavash M., "A Simple Transmit Diversity Technique for Wireless Communications," IEEE Jornal on Select Areas in Communications, vol. 16, No. 8, pp. 1451-1458 (1998).
Doonstnejad et al., "Space-time Spreading Codes for a Multiuser MIMO System", Institute of Electrical and Electronics Enrineers, Converence Rocord of the 36th, Asilomar Conference on Signals, Systems, and Computers Pacific Grove, CA Nov. 3-Nov. 6, 2002, pp. 1374-1378.
Farrokhi et al., "Link-Optimal Space-Time Processing With Multiple Transmit and Receive Antennas," IEEE Communications Letters, vol. 5, No. 3, pp. 85-87(2001).
Goldsmith et al., "Capacity Limits of MIMO Channels," IEE Jouranl on Selected Areas in Communications, vol. 21, No. 5, pp. 684-702, 2003.
Hanzo, L. et al., "Space-Time Spreading Aided Single-Carrier Wideband CDMA Communicating Over Multipath Nakagami Fading Channels" Ph. 8, pp. 279-310, John Wiley & Sons, England, 2003 (XP002357231).
Hochwald et al., "Systematic Design of Unitary Space-Time Constellations," IEEE Transactons on Information Theory, vol. 46, No. 6, pp. 1962-1973 (2000).
Hochwald et al., "Unitary Space-Time Modulation for Multiple-Antenna Communications in Rayleigh Flat Fading," IEEE Transactions on Information Theory, vol. 46, No. 2, pp. 543-564 (2000).
Li et al., "Transmit Diversity Over Quasi-Static Fading Channels Using Multiple Antennas and Random Signal Mapping,"IEEE Transactions of Communications, vol. 51, No. 11, pp. 1918-1926 (2003).
Marzetta et al., "Structured Unitary Space-Time Autocoding Constellations," IEEE Transactions on Information Theory, vol. 48, No. 4 pp. 942-950 (2002).
Medles et al., "Multistream Space-Time Coding by Spatial Spreading, Scrambling and Delay Diversity,", IEEE International Conference on Acoustics, Speech and Signal Processing, vol. 4 of 4, XP-10803692, pp. 2429-2432 (2002).
Yao, Huan, "Efficient Signal, Code, and Receiver Designs for MIMO Communication Systems,"Ph.D. Thesis, Massachusetts Institute of Technology, Cambridge, Massachusetts, 2003.
Yu and Cioffi, "Trellis Precoding for the Broadcast Channel," IEEE Global Telecommunications Conference, vol. 2, Electrical Engineering Department, Stanford, University, Stanford, California (2001), pp. 1344-1348.
International Search Report— PCT/US2005/031450, International Search Authority— European Patent Office—Jan. 16, 2006.
International Preliminary Examination Report—PCT/US2005/031450, International Search Authority—IPEA/US—Jul. 5, 2007.
Agustin A et al: "LDC Construction with a Defined Structure [MIMO Linear Dispersive Codes]" Vehicular Technology Conference, 2003.

VTC 2003-Fall. 2003 IEEE 58th Orlando, FL, USA Oct. 6-9, 2003. Piscataway, NJ, USA, IEEE, US, Oct. 6, 2003, PA.
Yu and Cioffi, "Trellis Precoding for the Broadcast Channel, " IEEE Global Telecommunications Conference, vol. 2, Electrical Engineering Department, Stanford, University, Stanford, California (2001).
Hochwald et al., "A Transmitter Diversity Scheme for Wideband CDMA Systems based on Space-time Spreading", Selected Areas in Communications, Jan. 2001.
Sharif et al., "On the Capacity of MIMO Broadcast Channel with Partial Side Information, Signals, Systems and Computers, 2003", Conference Record of the Thirty-Seventh Asilomar Conference, Nov. 12, 2003.
Sharif et al., "On the Capacity of MIMO Broadcast Channel with Partial Side Information", Department of Electrical Engineering, CA Institute of Engineering, IEEE 2002, pp. 958-962.
Jung-Tao Liu., Successive decoding of multiple space time coded streams in multi-input multi-output systems, Global Telecommunications Conference, 2002. Globecom '02. IEEE, USA, Nov. 21, 2002, 1007-1011 vol. 1.
Suthaharan et al.: Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.
Ketchum, et al., "PHY Design for Spatial Multiplexing MIMO WLAN", IEEE 802.11-04/0721rO, IEEE, Jul. 2004.
Antenna-Theoly.com, "Steering Vector", http://www.antenna-theory.com, pp. 1., No date given. (Cited by USPTO Examiner in U.S. Appl. No. 10/821.390 on Jan. 11, 2011).
Auer, G., "Channel Estimation for OFDM With Cyclic Delay Diversity," Personal, Indoor and Mobile Radio Communications, 2004. PIMRC 2004, 15th IEEE International Symposium on Sep. 5, 2004, vol. 3, pp. 1792-1796.
Bauch, et al., "Orthogonal Frequency Division Multiple Access with Cyclic Delay Diversity," ITG Workshop on Smart Antennas, Munich Germany, Mar. 18-19, 2004, pp. 17-24.
Bem et al., "Smart Antennas for Mobile Communications Systems," International Conference on Microwaves, Radar and Wireless Communications, vol. May 22, 2000, pp. 120-130, XP010537479.
Bourdoux et al., "Non-reciprocal transceivers in OFDM/SDMA Systems: Impact and Mitigation," Radio and Wireless Conference, Aug. 10, 2003, pp. 183-186, XP010656728.
Bruhl et al., "Investigation of Front-end Requirements for MIMO-Systems Using Downlink Pre-Distortion," European Personal Mobile Communications Conference, 2003, pp. 472-476 XP002330243.
Crow "The Fourier Matrix", Apr. 27, 2001, http://www.maths.abdn.ac.uk/~igc/tch/mx4002/notes/nodes91.html, pp. 1-3.
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-60, Sep. 1999.
IEEE Std. 802.11g IEEE Standard for Information technology—Telecommunications and information exchange between systems—Local and metropolitan area networks-Specific requirements—Part 11: Wireless LAN Medium Access Control (MAC) and Physical Layer (PHY) Specifications, Amendment 4; Further Higher Data Rate Extension in the 2.4 GHz Band, LAN/MAN Standards Committee IEEE Computer Society Jun. 27, 2003, pp. i-x & 1-67.
Jungnickel et al,, "A Mimo System with Reciprocal Transceivers for the Time-division Duplex Mode," Antennas and Propagation Society International Symposium, vol. 2, Jun. 20, 2004, pp. 1267-1270, XP010721570.
Kaiser, "Spatial Transmit Diversity Techniques for Broadband OFDM Systems," IEEE Global Telecommunications Conference, 2000. GLOBECOM '00. San Francisco, CA, Nov. 27-Dec. 1, 2000, vol. 3, pp. 1824-1828, XP001195742.
Laroia R et al., "Enhanced Opportunistic Beamforming," Vehicular Technology Conference, 2003. VTC 2003-Fall, IEEE 58th Orlando, FL, USA Oct. 6-9, 2003, pp. 1762-1766, XP010702878.
Liu et al., "OFDM—MIMO WLAN AP Front-end Gain and Phase Mismatch Calibration," IEEE Radio and Wireless Conference, Sep. 2004, pp. 151-154, XP002330244.

Narula, et al., "Performance Limits of Coded Diversity Methods for Transmitter Antenna Arrays," IEEE Transactions on Information Theory, vol, 45, No. 7, Nov, 1999, pp. 2418-2433.

Pan, et al., "Dynamic Sub-channel Allocation with Adaptive Beamforming for Broadband OFDM Wireless Systems," IEEE Global Telecommunications Conference, 2002. GLOBECOM '02. Taipei, Taiwan, Nov, 17-21, 2002, New York, NY, Nov, 17, 2002, vol. 1, 711-715.

T.L. Marzetta, B. Hassibi, B.M Hochwald, "Structured Unitary Space-Time Autocoding Constellations,"IEEE Trans. On It,vol. 48, No. 4, Apr. 2002.

Winters, J. "Smart antennas for wireless systems", IEEE Personal Communications, Dec. 5. 2003, pp. 1-113.

* cited by examiner

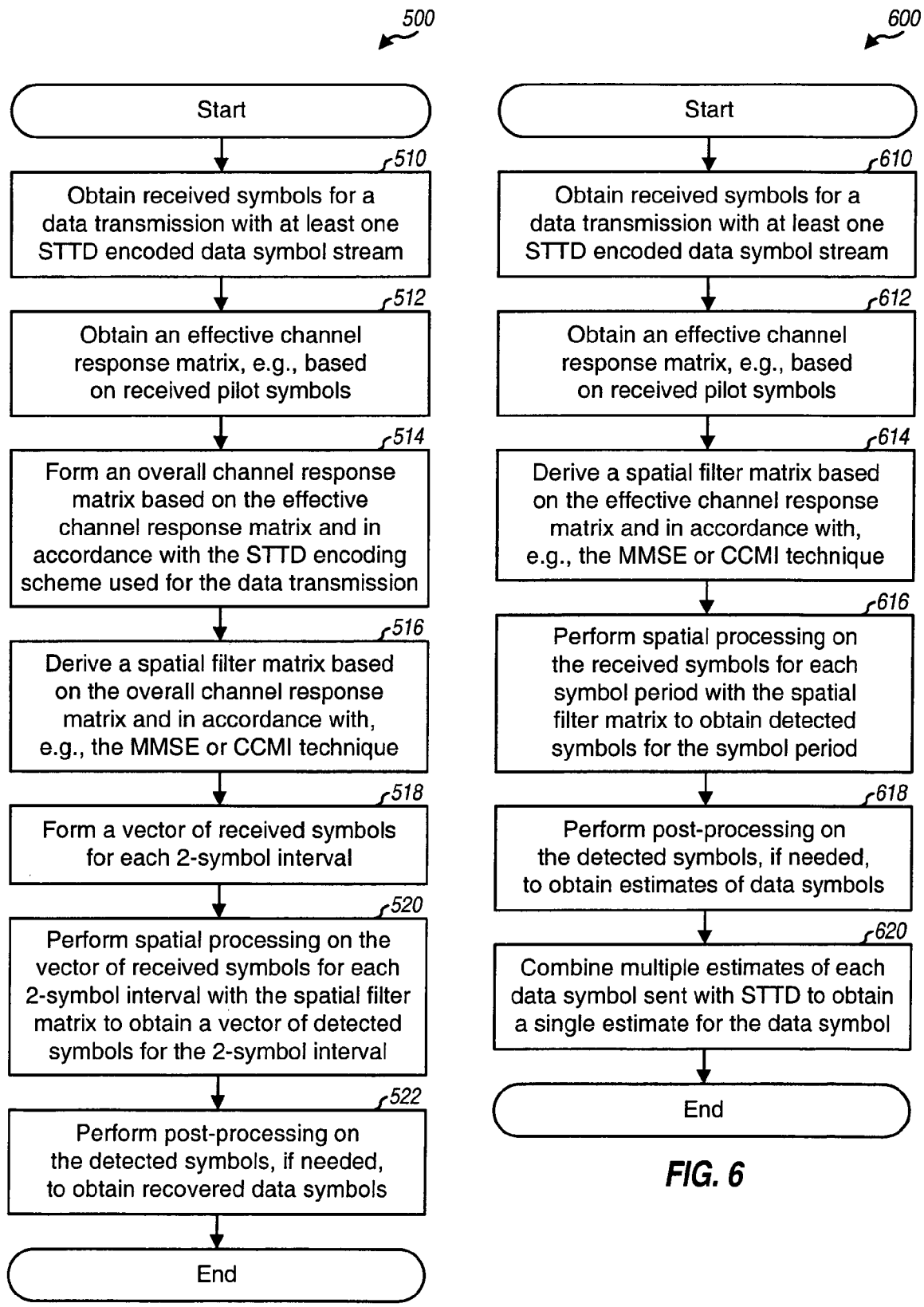

RECEIVER STRUCTURES FOR SPATIAL SPREADING WITH SPACE-TIME OR SPACE-FREQUENCY TRANSMIT DIVERSITY

CLAIM OF PRIORITY UNDER 35 U.S.C. §119

The present application for patent claims priority to Provisional Application Ser. No. 60/607,371, entitled "Steering Diversity with Space-Time Transmit Diversity for a Wireless Communication System," filed Sep. 3, 2004; and Provisional Application Ser. No. 60/608,226, entitled "Steering Diversity with Space-Time and Space-Frequency Transmit Diversity Schemes for a Wireless Communication System," filed Sep. 8, 2004, all assigned to the assignee hereof and hereby expressly incorporated by reference herein.

BACKGROUND

I. Field

The present invention relates generally to communication, and more specifically to techniques for processing data in a multiple-antenna communication system.

II. Background

A multi-antenna communication system employs multiple ($N_T$) transmit antennas and one or more ($N_R$) receive antennas for data transmission. The $N_T$ transmit antennas may be used to increase system throughput by transmitting different data from the antennas or to improve reliability by transmitting data redundantly.

In the multi-antenna communication system, a propagation path exists between each pair of transmit and receive antennas. $N_T \cdot N_R$ different propagation paths are formed between the $N_T$ transmit antennas and the $N_R$ receive antennas. These propagation paths may experience different channel conditions (e.g., different fading, multipath, and interference effects) and may achieve different signal-to-noise-and-interference ratios (SNRs). The channel responses of the $N_T \cdot N_R$ propagation paths may thus vary from path to path. For a dispersive communication channel, the channel response for each propagation path also varies across frequency. If the channel conditions vary over time, then the channel responses for the propagation paths likewise vary over time.

Transmit diversity refers to the redundant transmission of data across space, frequency, time, or a combination of these three dimensions to improve reliability for the data transmission. One goal of transmit diversity is to maximize diversity for the data transmission across as many dimensions as possible to achieve robust performance. Another goal is to simplify the processing for transmit diversity at both a transmitter and a receiver.

There is therefore a need in the art for techniques to process data for transmit diversity in a multi-antenna communication system.

SUMMARY

Techniques for transmitting and receiving data using a combination of transmit diversity schemes to improve performance are described herein. In an embodiment, a transmitting entity processes one or more ($N_D$) data symbol streams and generates multiple ($N_C$) coded symbol streams. Each data symbol stream may be sent as a single coded symbol stream or as two coded symbol streams using, e.g., space-time transmit diversity (STTD), space-frequency transmit diversity (SFTD), or orthogonal transmit diversity (OTD). The transmitting entity may perform spatial spreading on the $N_C$ coded symbol streams and generate $N_T$ transmit symbol streams. Additionally or alternatively, the transmitting entity may perform continuous beamforming on the $N_T$ transmit symbol streams in either the time domain or the frequency domain. These various transmit diversity schemes are described below.

A receiving entity obtains received symbols for the data transmission sent by the transmitting entity. The receiving entity derives an effective channel response matrix, e.g., based on received pilot symbols. This matrix includes the effects of the spatial spreading and/or continuous beamforming, if performed by the transmitting entity. In an embodiment, the receiving entity forms an overall channel response matrix based on the effective channel response matrix and in accordance with the STTD encoding scheme used by the transmitting entity. The receiving entity then derives a spatial filter matrix based on the overall channel response matrix and in accordance with, e.g., a minimum mean square error (MMSE) technique or a channel correlation matrix inversion (CCMI) technique. The receiving entity then performs spatial processing on a vector of received symbols for each 2-symbol interval with the spatial filter matrix to obtain a vector of detected symbols for the 2-symbol interval. The detected symbols are estimates of the transmitted coded symbols. The receiving entity performs post-processing (e.g., conjugation) on the detected symbols, if needed, to obtain recovered data symbols, which are estimates of the transmitted data symbols.

In another embodiment, the receiving entity derives a spatial filter matrix based on the effective channel response matrix. The receiving entity then performs spatial processing on the received symbols for each symbol period with the spatial filter matrix to obtain detected symbols for that symbol period. The receiving entity also performs post-processing on the detected symbols, if needed, to obtain estimates of data symbols. The receiving entity combines multiple estimates obtained for each data symbol sent with STTD and generates a single estimate for the data symbol.

Various aspects and embodiments of the invention are described in further detail below.

BRIEF DESCRIPTION OF THE DRAWINGS

FIG. 5 shows a process for receiving data with the MMSE or CCMI technique.

FIG. 6 shows a process for receiving data with the partial-MMSE or partial-CCMI technique.

DETAILED DESCRIPTION

Figure 1:
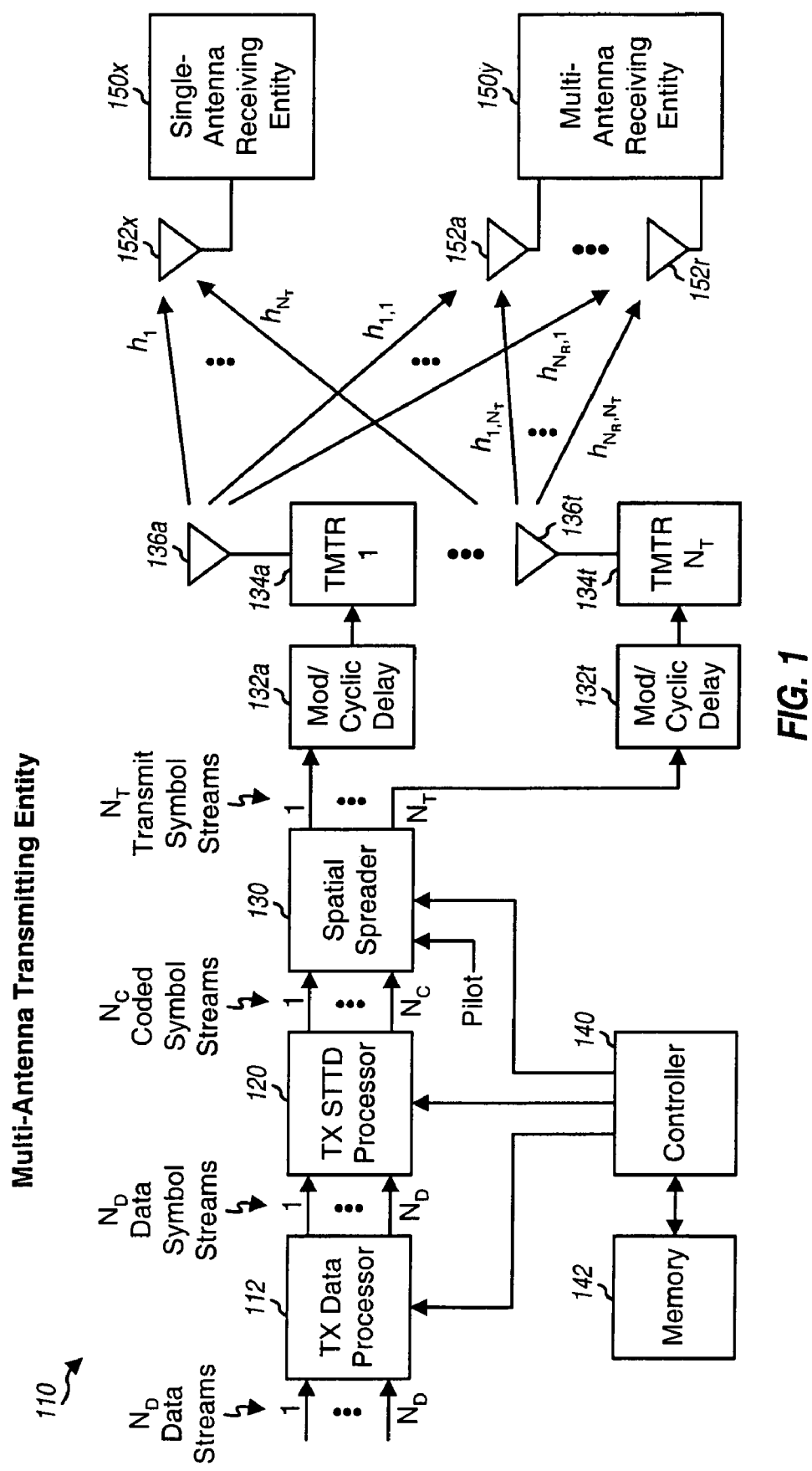
FIG. 1 shows a block diagram of a multi-antenna transmitting entity.

The word "exemplary" is used herein to mean "serving as an example, instance, or illustration." Any embodiment described herein as "exemplary" is not necessarily to be construed as preferred or advantageous over other embodiments.

The data transmission and reception techniques described herein may be used for multiple-input single-output (MISO) and multiple-input multiple-output (MIMO) transmissions. A MISO transmission utilizes multiple transmit antennas and a single receive antenna. A MIMO transmission utilizes multiple transmit antennas and multiple receive antennas. These techniques may also be used for single-carrier and multi-carrier communication systems. Multiple carriers may be obtained with orthogonal frequency division multiplexing (OFDM), some other multi-carrier modulation techniques, or some other construct. OFDM effectively partitions the overall system bandwidth into multiple ($N_F$) orthogonal frequency subbands, which are also called tones, subcarriers, bins, and frequency channels. With OFDM, each subband is associated with a respective subcarrier that may be modulated with data.

Transmit diversity may be achieved using various schemes including STTD, SFTD, OTD, spatial spreading, continuous beamforming, and so on. STTD transmits each pair of data symbols from two antennas on one subband in two symbol periods to achieve space and time diversity. SFTD transmits each pair of data symbols from two antennas on two subbands in one symbol period to achieve space and frequency diversity. OTD transmits each pair of data symbols from two antennas on one subband in two symbol periods using two orthogonal codes to achieve space and time diversity. As used herein, a data symbol is a modulation symbol for traffic/packet data, a pilot symbol is a modulation symbol for pilot (which is data that is known a priori by both the transmitting and receiving entities), a modulation symbol is a complex value for a point in a signal constellation for a modulation scheme (e.g., M-PSK or M-QAM), and a symbol is any complex value.

Spatial spreading refers to the transmission of a symbol from multiple transmit antennas simultaneously, possibly with different amplitudes and/or phases determined by a steering vector used for that symbol. Spatial spreading is also called steering diversity, transmit steering, pseudo-random transmit steering, and so on. Spatial spreading may be used in combination with STTD, SFTD, OTD, and/or continuous beamforming to improve performance.

Continuous beamforming refers to the use of different beams across the $N_F$ subbands. The beamforming is continuous in that the beams change in a gradual instead of abrupt manner across the subbands. Continuous beamforming may be performed in the frequency domain by multiplying the symbols for each subband with a beamforming matrix for that subband. Continuous beamforming may also be performed in the time domain by applying different cyclic or circular delays for different transmit antennas.

Transmit diversity may also be achieved using a combination of schemes. For example, transmit diversity may be achieved using a combination of either STTD or SFTD and either spatial spreading or continuous beamforming. As another example, transmit diversity may be achieved using a combination of STTD or SFTD, spatial spreading, and continuous beamforming.

FIG. 1 shows a block diagram of an embodiment of a multi-antenna transmitting entity 110. For this embodiment, transmitting entity 110 uses a combination of STTD, spatial spreading, and continuous beamforming for data transmission. A transmit (TX) data processor 112 receives and processes $N_D$ data streams and provides $N_D$ data symbol streams, where $N_D \geq 1$. TX data processor 112 may process each data stream independently or may jointly process multiple data streams together. For example, TX data processor 112 may format, scramble, encode, interleave, and symbol map each data stream in accordance with a coding and modulation scheme selected for that data stream. A TX STTD processor 120 receives the $N_D$ data symbol streams, performs STTD processing or encoding on at least one data symbol stream, and provides $N_C$ streams of coded symbols, where $N_C \geq N_D$.

In general, TX STTD processor 120 may process one or more data symbol streams with STTD, SFTD, OTD, or some other transmit diversity scheme. Each data symbol stream may be sent as one coded symbol stream or multiple coded symbol streams, as described below.

A spatial spreader 130 receives and multiplexes the coded symbols with pilot symbols, performs spatial spreading by multiplying the coded and pilot symbols with steering matrices, and provides $N_T$ transmit symbol streams for the $N_T$ transmit antennas, where $N_T \geq N_C$. Each transmit symbol is a complex value to be sent on one subband in one symbol period from one transmit antenna. $N_T$ modulators (Mod) 132a through 132t receive the $N_T$ transmit symbol streams. For an OFDM system, each modulator 132 performs OFDM modulation on its transmit symbol stream and provides a stream of time-domain samples. Each modulator 132 may also apply a cyclic delay for each OFDM symbol. $N_T$ modulators 132a through 132t provide $N_T$ streams of time-domain samples to $N_T$ transmitter units (TMTR) 134a through 134t, respectively. Each transmitter unit 134 conditions (e.g., converts to analog, amplifies, filters, and frequency upconverts) its sample stream and generates a modulated signal. $N_T$ modulated signals from $N_T$ transmitter units 134a through 134t are transmitted from $N_T$ transmit antennas 136a through 136t, respectively.

Controller 140 controls the operation at transmitting entity 110. Memory unit 142 stores data and/or program codes used by controller 140.

Figure 2:
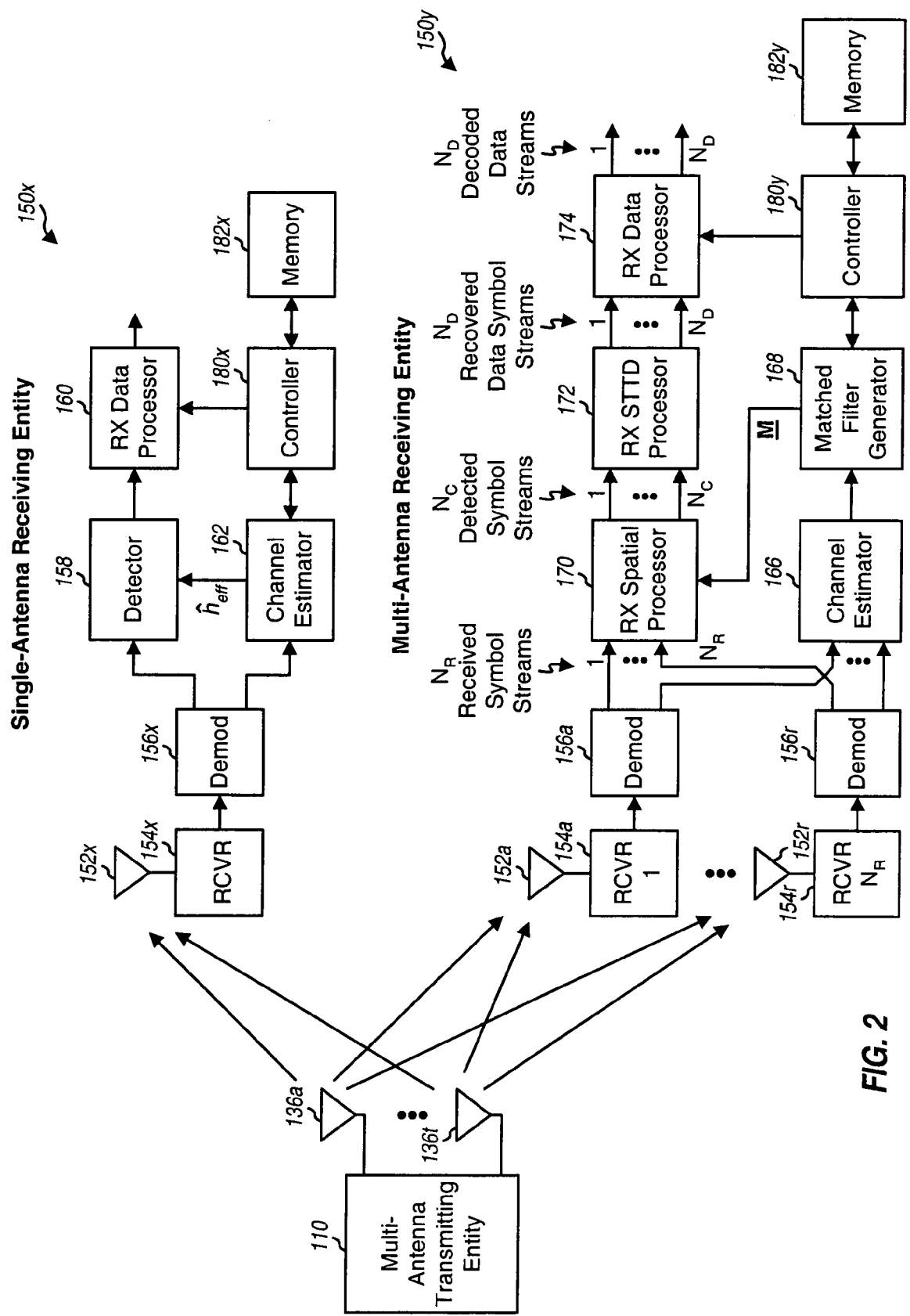
FIG. 2 shows a block diagram of a single-antenna receiving entity and a multi-antenna receiving entity.

FIG. 2 shows a block diagram of an embodiment of a single-antenna receiving entity 150x and a multi-antenna receiving entity 150y. At single-antenna receiving entity 150x, an antenna 152x receives the $N_T$ transmitted signals and provides a received signal to a receiver unit (RCVR) 154x. Receiver unit 154x performs processing complementary to that performed by transmitter units 134 and provides a stream of received samples to a demodulator (Demod) 156x. For an OFDM system, demodulator 156x performs OFDM demodulation on the received samples to obtain received symbols, provides received data symbols to a detector 158, and provides received pilot symbols to a channel estimator 162. Channel estimator 162 derives an effective channel response estimate for a single-input single-output (SISO) channel between transmitting entity 110 and receiving entity 150x for each subband used for data transmission. Detector 158 performs data detection on the received data symbols for each subband based on the effective SISO channel response estimate for that subband and provides recovered data symbols for the subband. An RX data processor 160 processes (e.g., symbol demaps, deinterleaves, and decodes) the recovered data symbols and provides decoded data.

At multi-antenna receiving entity 150y, $N_R$ antennas 152a through 152r receive the $N_T$ transmitted signals, and each antenna 152 provides a received signal to a respective receiver unit 154. Each receiver unit 154 processes its received signal and provides a received sample stream to an associated demodulator 156. Each demodulator 156 performs OFDM demodulation on its received sample stream, provides received data symbols to an RX spatial processor 170, and provides received pilot symbols to a channel estimator 166. Channel estimator 166 derives a channel response estimate for the actual or effective MIMO channel between transmitting entity 110 and receiving entity 150y for each subband used for data transmission. A matched filter generator 168 derives a spatial filter matrix for each subband based on the channel response estimate for that subband. RX spatial processor 170 performs receiver spatial processing (or spatial matched filtering) on the received data symbols for each subband with the spatial filter matrix for that subband and provides detected symbols for the subband. An RX STTD processor 172 performs post-processing on the detected symbols and provides recovered data symbols. An RX data processor 174 processes (e.g., symbol demaps, deinterleaves, and decodes) the recovered data symbols and provides decoded data.

Controllers 180x and 180y control the operation at receiving entities 150x and 150y, respectively. Memory units 182x and 182y store data and/or program codes used by controllers 180x and 180y, respectively.

1. Transmitter Processing

Transmitting entity 110 may transmit any number of data symbol streams with STTD and any number of data symbol streams without STTD, depending on the number of transmit and receive antennas available for data transmission. The STTD encoding for one data symbol stream may be performed as follows. For each pair of data symbols $s_a$ and $s_b$ to be sent in two symbol periods of the data symbol stream, TX STTD processor 120 generates two vectors $\underline{s}_1 = [s_a \ s_b]^T$ and $\underline{s}_2 = [s_b^* \ -s_a^*]^T$, where "*" denotes the complex conjugate and "$T$" denotes the transpose. Alternatively, TX STTD processor 120 may generate two vectors $\underline{s}_1 = [s_a \ -s_b]^T$ and $\underline{s}_2 = [s_b \ s_a^*]^T$ for each pair of data symbols $s_a$ and $s_b$. For both STTD encoding schemes, each vector $\underline{s}_t$, for t=1, 2, includes two coded symbols to be sent from $\overline{N}_T$ transmit antennas in one symbol period, where $N_T \geq 2$. Vector $\underline{s}_1$ is sent in the first symbol period, and vector $\underline{s}_2$ is sent in the next symbol period. Each data symbol is included in both vectors and is thus sent over two symbol periods. The m-th coded symbol stream is sent in the m-th element of the two vectors $\underline{s}_1$ and $\underline{s}_2$. For clarity, the following description is for the STTD encoding scheme with $\underline{s}_1 = [s_a \ s_b]^T$ and $\underline{s}_2 = [s_b^* \ -s_a^*]^T$. For this STTD encoding scheme, the first coded symbol stream includes coded symbols $s_a$ and $s_b^*$, and the second coded symbol stream includes coded symbols $s_b$ and $-s_a^*$.

Table 1 lists four configurations that may be used for data transmission. An $N_D \times N_C$ configuration denotes the transmission of $N_D$ data symbol streams as $N_C$ coded symbol streams, where $N_D \geq 1$ and $N_C \geq N_D$. The first column identifies the four configurations. For each configuration, the second column indicates the number of data symbol streams being sent, and the third column indicates the number of coded symbol streams. The fourth column lists the $N_D$ data symbol streams for each configuration, the fifth column lists the coded symbol stream(s) for each data symbol stream, the sixth column gives the coded symbol to be sent in the first symbol period (t=1) for each coded symbol stream, and the seventh column gives the coded symbol to be sent in the second symbol period (t=2) for each coded symbol stream. The number of data symbols sent in each 2-symbol interval is equal to twice the number of data symbol streams. The eighth column indicates the number of transmit antennas required for each configuration, and the ninth column indicates the number of receive antennas required for each configuration. As shown in Table 1, for each data symbol stream that is sent as one coded symbol stream without STTD, the data symbol sent in the second symbol period (t=2) is conjugated to match the conjugation performed on the data symbols in the STTD encoded data symbol stream.

TABLE 1

| Config | Num Data Symbol Streams $N_D$ | Num Coded Symbol Streams $N_C$ | Data Symbol Stream | Coded Symbol Stream | Coded Symbol (t = 1) $s_1$ | Coded Symbol (t = 2) $s_2$ | Req Num TX Ants $N_T$ | Req Num RX Ants $N_R$ |
|---|---|---|---|---|---|---|---|---|
| 1 × 2 | 1 | 2 | 1 | 1 | $s_a$ | $s_b^*$ | $N_T \geq 2$ | $N_R \geq 1$ |
|  |  |  |  | 2 | $s_b$ | $-s_a^*$ |  |  |
| 2 × 3 | 2 | 3 | 1 | 1 | $s_a$ | $s_b^*$ | $N_T \geq 3$ | $N_R \geq 2$ |
|  |  |  |  | 2 | $s_b$ | $-s_a^*$ |  |  |
|  |  |  | 2 | 3 | $s_c$ | $s_d^*$ |  |  |
| 2 × 4 | 2 | 4 | 1 | 1 | $s_a$ | $s_b^*$ | $N_T \geq 4$ | $N_R \geq 2$ |
|  |  |  |  | 2 | $s_b$ | $-s_a^*$ |  |  |
|  |  |  | 2 | 3 | $s_c$ | $s_d^*$ |  |  |
|  |  |  |  | 4 | $s_d$ | $-s_c^*$ |  |  |
| 3 × 4 | 3 | 4 | 1 | 1 | $s_a$ | $s_b^*$ | $N_T \geq 4$ | $N_R \geq 3$ |
|  |  |  |  | 2 | $s_b$ | $-s_a^*$ |  |  |
|  |  |  | 2 | 3 | $s_c$ | $s_d^*$ |  |  |
|  |  |  | 3 | 4 | $s_e$ | $s_f^*$ |  |  |

As an example, for the 2×3 configuration, two data symbol streams are sent as three coded symbol streams. The first data symbol stream is STTD encoded to generate two coded symbol streams. The second data symbol stream is sent without STTD as the third coded symbol stream. Coded symbols $s_a$, $s_b$ and $s_c$ are sent from at least three transmit antennas in the first symbol period, and coded symbols $s_b^*$, $-s_a^*$ and $s_d^*$ are sent in the second symbol period. A receiving entity uses at least two receive antennas to recover the two data symbol streams.

Table 1 shows four configurations that may be used for data transmission whereby each configuration has at least one STTD encoded data symbol stream. Other configurations may also be used for data transmission. In general, any number of data symbol streams may be sent as any number of coded symbol streams from any number of transmit antennas, where $N_D \geq 1$, $N_C \geq N_D$, $N_T \geq N_C$, and $N_R \geq N_D$.

The transmitting entity may process the coded symbols for spatial spreading and continuous beamforming as follows:

$$\underline{x}_t(k) = \underline{B}(k) \cdot \underline{V}(k) \cdot \underline{G}(k) \cdot \underline{s}_t(k), \text{ for } t=1, 2, \qquad \text{Eq (1)}$$

where $\underline{s}_t(k)$ is an $N_C \times 1$ vector with $N_C$ coded symbols to be sent on subband k in symbol period t;

$\underline{G}(k)$ is an $N_C \times N_C$ diagonal matrix with $N_C$ gain values along the diagonal for the $N_C$ coded symbols in $\underline{s}_t(k)$ and zeros elsewhere;

$\underline{V}(k)$ is an $N_T \times N_C$ steering matrix for spatial spreading for subband k;

$\underline{B}(k)$ is an $N_T \times N_T$ diagonal matrix for continuous beamforming for subband k; and $\underline{x}_t(k)$ is an $N_T \times 1$ vector with $N_T$ transmit symbols to be sent from the $N_T$ transmit antennas on subband k in symbol period t.

Vector $s_1$ contains $N_C$ coded symbols to be sent in the first symbol period, and vector $s_2$ contains $N_C$ coded symbols to be sent in the second symbol period. Vectors $s_1$ and $s_2$ may be formed as shown in Table 1 for the four configurations. For example, $\underline{s}_1 = [s_a\ s_b\ s_c]^T$ and $\underline{s}_2 = [s_b^*\ -s_a^*\ s_d^*]^T$ for the 2×3 configuration.

The gain matrix $G(k)$ determines the amount of transmit power to use for each of the $N_C$ coded symbol streams. The total transmit power available for transmission may be denoted as $P_{total}$. If equal transmit power is used for the $N_C$ coded symbol streams, then the diagonal elements of $G(k)$ have the same value, which is $\sqrt{P_{total}/N_C}$. If equal transmit power is used for the $N_D$ data symbol streams, then the diagonal elements of $G(k)$ may or may not be equal depending on the configuration. The $N_C$ gain values in $G(k)$ may be defined to achieve equal transmit power for the $N_D$ data symbol streams being sent simultaneously. As an example, for the 2×3 configuration, the first data symbol stream is sent as two coded symbol streams and the second data symbol stream is sent as one coded symbol stream. To achieve equal transmit power for the two data symbol streams, a 3×3 gain matrix $G(k)$ may include gain values of $\sqrt{P_{total}/4}$, $\sqrt{P_{total}/4}$, and $\sqrt{P_{total}/2}$ along the diagonal for the three coded symbol streams. Each coded symbol in the third coded symbol stream is then scaled by $\sqrt{P_{total}/2}$ and is transmitted with twice the power as the other two coded symbols sent in the same symbol period. The $N_C$ coded symbols for each symbol period may also be scaled to utilize the maximum transmit power available for each transmit antenna. In general, the elements of $G(k)$ may be selected to utilize any amount of transmit power for the $N_C$ coded symbol streams and to achieve any desired SNRs for the $N_D$ data symbol streams. The power scaling for each coded symbol stream may also be performed by scaling the columns of the steering matrix $V(k)$ with appropriate gains.

A given data symbol stream (denoted as {s}) may be sent as one coded symbol stream (denoted as {š}) in other manners. In one embodiment, the gain matrix $G(k)$ contains ones along the diagonal, and coded symbol stream {š} is transmitted at the same power level as the other coded symbol streams. For this embodiment, data symbol stream {s} is transmitted at lower transmit power than an STTD encoded data symbol stream and achieves a lower received SNR at the receiving entity. The coding and modulation for data symbol stream {s} may be selected to achieve the desired performance, e.g., the desired packet error rate. In another embodiment, each data symbol in data symbol stream {s} is repeated and transmitted in two symbol periods. As an example, for the 2×3 configuration, data symbol $s_c$ is sent in two symbol periods, then data symbol $s_d$ is sent in two symbol periods, and so on. Similar received SNRs for all $N_D$ data symbol streams may simplify processing (e.g., encoding) at both the transmitting and receiving entities.

The steering matrix $V(k)$ spatially spreads the $N_C$ coded symbols for each symbol period such that each coded symbol is transmitted from all $N_T$ transmit antennas and achieves spatial diversity. Spatial spreading may be performed with various types of steering matrices, such as Walsh matrices, Fourier matrices, pseudo-random matrices, and so on, which may be generated as described below. The same steering matrix $V(k)$ is used for the two vectors $s_1(k)$ and $s_2(k)$ for each subband k. The same or different steering matrices may be used for different subbands. Different steering matrices may be used for different time intervals, where each time interval spans an integer multiple of two symbol periods for STTD.

The matrix $B(k)$ performs continuous beamforming in the frequency domain. For an OFDM system, a different beamforming matrix may be used for each subband. The beamforming matrix for each subband k may be a diagonal matrix having the following form:

$$\underline{B}(k) = \begin{bmatrix} b_1(k) & 0 & \cdots & 0 \\ 0 & b_2(k) & \cdots & 0 \\ \vdots & \vdots & \ddots & \vdots \\ 0 & 0 & \cdots & b_{N_T}(k) \end{bmatrix}, \text{ for } k = 1 \ldots N_F, \quad \text{Eq (2)}$$

where $b_i(k)$ is a weight for subband k of transmit antenna i. The weight $b_i(k)$ may be defined as:

$$b_i(k) = e^{-j2\pi \cdot \Delta T(i) \cdot l(k) \cdot \Delta f}, \text{ for } i=1 \ldots N_T \text{ and } k=1 \ldots N_F, \quad \text{Eq (3)}$$

where
  $\Delta T(i)$ is the time delay on transmit antenna i; and
  $l(k) \cdot \Delta f$ is the actually frequency that corresponds to subband index k.

For example, if $N_F=64$, then subband index k goes from 1 to 64, and $l(k)$ may map k to −32 to +31, respectively. $\Delta f$ denotes the frequency spacing between adjacent subbands. For example, if the overall system bandwidth is 20 MHz and $N_F=64$, then $\Delta f=20$ MHz/64=3.125 kHz. $l(k) \cdot \Delta f$ provides the actual frequency (in Hertz) for each value of k. The weights $b_i(k)$ shown in equation (3) correspond to a progressive phase shift across the $N_F$ total subbands of each transmit antenna, with the phase shift changing at different rates for the $N_T$ transmit antennas. These weights effectively form a different beam for each subband.

Continuous beamforming may also be performed in the time domain as follows. For each symbol period, an $N_F$-point inverse discrete Fourier transform (IDFT) is performed on $N_F$ transmit symbols for each transmit antenna i to generate $N_F$ time-domain samples for that transmit antenna. The $N_F$ time-domain samples for each transmit antenna i are then cyclically or circularly delayed with a delay of $T_i$. For example, $T_i$ may be defined as: $T_i = \Delta T \cdot (i-1)$, for $i=1 \ldots N_T$, where $\Delta T$ may be equal to one sample period, a fraction of a sample period, or more than one sample period. The time-domain samples for each antenna are thus cyclically delayed by a different amount.

For simplicity, the following description is for one subband, and the subband index k is dropped from the notations. The receiver spatial processing for each subband may be performed in the same manner, albeit with a spatial filter matrix obtained for that subband. The gain matrix $G(k)$ does not affect the receiver spatial processing and is omitted from the following description for clarity. The gain matrix $G(k)$ may also be viewed as being incorporated in the vectors $\underline{s}_1$ and $\underline{s}_2$.

2. Single-Antenna Receiver Processing

A single-antenna receiving entity may receive a data transmission sent using the 1×2 configuration. The received symbols from the single receive antenna may be expressed as:

$$r_t = \underline{h} \cdot \underline{x}_t + n_t = \underline{h} \cdot \underline{B} \cdot \underline{V} \cdot \underline{s}_t + n_t = \underline{h}_{eff} \cdot \underline{s}_t + n_t, \text{ for } t=1, 2, \quad \text{Eq (4)}$$

where
  $r_t$ is a received symbol for symbol period t;
  $\underline{h}$ is a 1×$N_T$ channel response row vector, which is $\underline{h}=[h_1, h_2, \ldots, h_{N_T}]$;
  $\underline{h}_{eff}$ is a 1×2 effective channel response row vector for the 1×2 configuration, which is $\underline{h}_{eff} = \underline{h} \cdot \underline{B} \cdot \underline{V} = [h_{eff,1}\ h_{eff,2}]$; and
  $n_t$ is the noise for symbol period t.

The MISO channel response h is assumed to be constant over the two symbol periods for vectors $\underline{s}_1$ and $\underline{s}_2$.

The single-antenna receiving entity may derive estimates of the two data symbols $s_a$ and $s_b$, as follows:

$$\hat{s}_a = \frac{\hat{h}_{eff,1}^* \cdot r_1 - \hat{h}_{eff,2} \cdot r_2^*}{\beta'} = s_a + n'_a, \text{ and} \qquad \text{Eq (5)}$$

$$\hat{s}_b = \frac{\hat{h}_{eff,2}^* \cdot r_1 + \hat{h}_{eff,1} \cdot r_2^*}{\beta'} = s_b + n'_b,$$

where $\hat{h}_{eff,m}$ is an estimate of $h_{eff,m}$, for m=1, 2;
$\beta' = |\hat{h}_{eff,1}|^2 + |\hat{h}_{eff,2}|^2$; and
$n'_a$ and $n'_b$ are post-processed noise for detected symbols $\hat{s}_a$ and $\hat{s}_b$, respectively.

The receiving entity may also derive the detected symbols using MMSE processing described below.

3. Multi-Antenna Receiver Processing

A multi-antenna receiving entity may receive a data transmission sent using any of the configurations supported by the number of receive antennas available at that receiving entity, as shown in Table 1. The received symbols from the multiple receive antennas may be expressed as:

$$\underline{r}_t = \underline{H} \cdot \underline{x}_t + \underline{n}_t = \underline{H} \cdot \underline{B} \cdot \underline{V} \cdot \underline{s}_t + \underline{n}_t = \underline{H}_{eff} \cdot \underline{s}_t + \underline{n}_t, \text{ for } t=1, 2, \qquad \text{Eq (6)}$$

where $\underline{r}_t$ is an $N_R \times 1$ vector with $N_R$ received symbols for symbol period t;
H is an $N_R \times N_T$ channel response matrix;
$\underline{H}_{eff}$ is an $N_R \times N_C$ effective channel response matrix; and
$\underline{n}_t$ is a noise vector for symbol period t.

The receiving entity can typically obtain an estimate of H based on a pilot received from the transmitting entity. The receiving entity uses $\underline{H}_{eff}$ to recover $\underline{s}_t$.

The effective channel response matrix $\underline{H}_{eff}$ may be expressed as:

$$\underline{H}_{eff} = \underline{H} \cdot \underline{B} \cdot \underline{V}, \qquad \text{Eq (7)}$$

and has the following form:

$$H_{eff} = \begin{bmatrix} h_{eff,1,1} & h_{eff,1,2} & \cdots & h_{eff,1,N_C} \\ h_{eff,2,1} & h_{eff,2,2} & \cdots & h_{eff,2,N_C} \\ \vdots & \vdots & \ddots & \vdots \\ h_{eff,N_R,1} & h_{eff,N_R,2} & \cdots & h_{eff,N_R,N_C} \end{bmatrix}, \qquad \text{Eq (8)}$$

where $h_{eff,j,m}$ is the channel gain for coded symbol stream m at receive antenna j. The effective channel response matrix $\underline{H}_{eff}$ is dependent on the configuration used for data transmission and the number of receive antennas. The MIMO channel response matrix H and the effective channel response matrix $\underline{H}_{eff}$ are assumed to be constant over two symbol periods for vectors $\underline{s}_1$ and $\underline{s}_2$.

For the 1×2 configuration, the effective channel response matrix is an $N_R \times 2$ matrix that may be given as: $\underline{H}_{eff} = \underline{H} \cdot \underline{B} \cdot \underline{V} = [\underline{h}_{eff,1} \ \underline{h}_{eff,2}]$, where $\underline{h}_{eff,m}$ is an effective channel response vector for coded symbol stream m. The multi-antenna receiving entity may derive estimates of the two data symbols $s_a$ and $s_b$, as follows:

$$\hat{s}_a = \frac{\hat{\underline{h}}_{eff,1}^H \cdot \underline{r}_1 - \underline{r}_2^H \cdot \hat{\underline{h}}_{eff,2}}{\beta''} = s_a + n''_a, \text{ and} \qquad \text{Eq (9)}$$

-continued $$\hat{s}_b = \frac{\hat{\underline{h}}_{eff,2}^H \cdot \underline{r}_1 + \underline{r}_2^H \cdot \hat{\underline{h}}_{eff,1}}{\beta''} = s_b = n''_b,$$

where $\hat{\underline{h}}_{eff,m}$ is an estimate of $\underline{h}_{eff,m}$, for m=1, 2;
$\beta'' = ||\hat{\underline{h}}_{eff,1}||^2 + ||\hat{\underline{h}}_{eff,2}||^2$;
"H" denotes the conjugate transpose; and
$n''_a$ and $n''_b$ are post-processed noise for detected symbols $\hat{s}_a$ and $\hat{s}_b$, respectively.

The data symbols $s_a$ and $s_b$ may also be recovered using other receiver spatial processing techniques, as described below.

To facilitate the receiver spatial processing, a single data vector $\underline{s}$ may be formed for the $2N_D$ data symbols included in vectors $\underline{s}_1$ and $\underline{s}_2$ sent in two symbol periods. A single received vector $\underline{r}$ may also be formed for the $2N_R$ received symbols included in vectors $\underline{r}_1$ and $\underline{r}_2$ obtained in two symbol periods. The received vector $\underline{r}$ may then be expressed as:

$$\underline{r} = \underline{H}_{all} \cdot \underline{s} + \underline{n}_{all}, \qquad \text{Eq (10)}$$

where $\underline{r}$ is a $2N_R \times 1$ vector with $2N_R$ received symbols obtained in two symbol periods;
$\underline{s}$ is a $2N_D \times 1$ vector with $2N_D$ data symbols sent in two symbol periods;
$\underline{H}_{all}$ is a $2N_R \times 2N_D$ overall channel response matrix observed by the data symbols in $\underline{s}$; and
$\underline{n}_{all}$ is a noise vector for the $2N_D$ data symbols.

The overall channel response matrix $\underline{H}_{all}$ contains twice the number of rows as the effective channel response matrix $\underline{H}_{eff}$ and includes the effects of STTD, spatial spreading, and continuous beamforming performed by the transmitting entity. The elements of $\underline{H}_{all}$ are derived based on the elements of $\underline{H}_{eff}$, as described below.

For the 2×3 configuration, the transmitting entity generates vectors $\underline{s}_1 = [s_a \ s_b \ s_c]^T$ and $\underline{s}_2 = [s^*_b \ -s^*_a \ s^*_d]^T$ for four data symbols $s_a$, $s_b$, $s_c$ and $s_d$ to be sent in two symbol periods for two data symbol streams, as shown in Table 1. Each vector $\underline{s}_t$ contains three coded symbols to be sent from the $N_T$ transmit antennas in one symbol period, where $N_T \geq 3$ for the 2×3 configuration.

If the receiving entity is equipped with two receive antennas ($N_R = 2$), then $\underline{r}_t$ is a 2×1 vector with two received symbols for symbol period t, H is a $2 \times N_T$ channel response matrix, and $\underline{H}_{eff}$ is a 2×3 effective channel response matrix. The effective channel response matrix for the 2×3 configuration with two receive antennas, which is denoted as $\underline{H}_{eff}^{2/2 \times 3}$, may be expressed as:

$$\underline{H}_{eff}^{2/2 \times 3} = \begin{bmatrix} h_{eff,1,1} & h_{eff,1,2} & h_{eff,1,3} \\ h_{eff,2,1} & h_{eff,2,2} & h_{eff,2,3} \end{bmatrix}. \qquad \text{Eq (11)}$$

The received symbols for the first symbol period are denoted as $\underline{r}_1 = [r_{1,1} \ r_{2,1}]^T$, and the received symbols for the second symbol period are denoted as $\underline{r}_2 = [r_{1,2} \ r_{2,2}]^T$, where $r_{j,t}$ is the received symbol from receive antenna j in symbol period t. These four received symbols may be expressed as:

$$r_{1,1} = +h_{eff,1,1} \cdot s_a + h_{eff,1,2} \cdot s_b + h_{eff,1,3} \cdot s_c + n_{1,1}, \qquad \text{Eq (12a)}$$

$$r_{2,1} = +h_{eff,2,1} \cdot s_a + h_{eff,2,2} \cdot s_b + h_{eff,2,3} \cdot s_c + n_{2,1}, \qquad \text{Eq (12b)}$$

$$r_{1,2} = -h_{eff,1,2} \cdot s^*_a + h_{eff,1,1} \cdot s^*_b + h_{eff,1,3} \cdot s^*_d + n_{1,2}, \text{ and} \qquad \text{Eq (12c)}$$

$$r_{2,2} = -h_{eff,2,2} \cdot s^*_a + h_{eff,2,1} \cdot s^*_b + h_{eff,2,3} \cdot s^*_d + n_{2,2}. \qquad \text{Eq (12d)}$$

For the 2×3 configuration with two receive antennas, the data vector $\underline{s}$ may be formed as $\underline{s} = [s_a \ s_b \ s_c \ s_d]^T$, the received vector r may be formed as $\underline{r}=[r_{1,1}\ r_{2,1}\ r^*_{1,2}\ r^*_{2,2}]^T$, and the overall channel response matrix $\underline{H}_{all}^{2/2\times 3}$ may be expressed as:

$$\underline{H}_{all}^{2/2\times 3} = \begin{bmatrix} h_{eff,1,1} & h_{eff,1,2} & h_{eff,1,3} & 0 \\ h_{eff,2,1} & h_{eff,2,2} & h_{eff,2,3} & 0 \\ -h^*_{eff,1,2} & h^*_{eff,1,1} & 0 & h^*_{eff,1,3} \\ -h^*_{eff,2,2} & h^*_{eff,2,1} & 0 & h^*_{eff,2,3} \end{bmatrix}. \quad \text{Eq (13)}$$

With the above formulation, r may be expressed based on $\underline{H}_{all}^{2/2\times 3}$ and s, as shown in equation (10). The matrix $\underline{H}_{all}^{2/2\times 3}$ is formed from equation set (12) and using the property: $r=h\cdot s^* \Rightarrow r^*=h^*\cdot s$. As shown in equation (13), the first two rows of $\underline{H}_{all}^{2/2\times 3}$ contain all of the elements of $\underline{H}_{eff}^{2/2\times 3}$, and the last two rows of $\underline{H}_{all}^{2/2\times 3}$ contain the elements of $\underline{H}_{eff}^{2/2\times 3}$ but rearranged and transformed (i.e., conjugated and/or inverted) due to the STTD encoding on the data symbols.

For the 2×4 configuration, the transmitting entity generates vectors $\underline{s}_1=[s_a\ s_b\ s_c\ s_d]$ and $\underline{s}_2=[s^*_b\ -s^*_a\ s^*_d\ -s^*_c]^T$ for two pairs of data symbols ($s_a$ and $s_b$) and ($s_c$ and $s_d$) to be sent in two symbol periods for two data symbol streams. Each vector $\underline{s}_t$ includes four coded symbols to be sent from the $N_T$ transmit antennas in one symbol period, where $N_T \geq 4$ for the 2×4 configuration.

If the receiving entity is equipped with two receive antennas ($N_R=2$), then $\underline{r}_t$ is a 2×1 vector with two received symbols for symbol period t, H is a 2×$N_T$ channel response matrix, and $\underline{H}_{eff}$ is a 2×4 effective channel response matrix. The effective channel response matrix for the 2×4 configuration with two receive antennas, which is denoted as $\underline{H}_{eff}^{2/2\times 4}$, may be expressed as:

$$\underline{H}_{eff}^{2/2\times 4} = \begin{bmatrix} h_{eff,1,1} & h_{eff,1,2} & h_{eff,1,3} & h_{eff,1,4} \\ h_{eff,2,1} & h_{eff,2,2} & h_{eff,2,3} & h_{eff,2,4} \end{bmatrix}. \quad \text{Eq (15)}$$

The received symbols from the two receive antennas in two symbol periods may be expressed as:

$$r_{1,1}=+h_{eff,1,1}\cdot s_a+h_{eff,1,2}\cdot s_b+h_{eff,1,3}\cdot s_c+h_{eff,1,4}\cdot s_d+n_{1,1}, \quad \text{Eq (15a)}$$

$$r_{2,1}=+h_{eff,2,1}\cdot s_a+h_{eff,2,2}\cdot s_b+h_{eff,2,3}\cdot s_c+h_{eff,2,4}\cdot s_d+n_{2,1}, \quad \text{Eq (15b)}$$

$$r_{1,2}=-h_{eff,1,2}\cdot s^*_a+h_{eff,1,1}\cdot s^*_b-h_{eff,1,4}\cdot s^*_c+h_{eff,1,3}\cdot s^*_d+n_{1,2}, \text{ and} \quad \text{Eq (15c)}$$

$$r_{2,2}=-h_{eff,2,2}\cdot s^*_a+h_{eff,2,1}\cdot s^*_b-h_{eff,2,4}\cdot s^*_c+h_{eff,2,3}\cdot s^*_d+n_{2,2}. \quad \text{Eq (15d)}$$

For the 2×4 configuration with two receive antennas, the data vector s may be formed as $\underline{s}=[s_a\ s_b\ s_c\ s_d]^T$ the received vector r may be formed as $\underline{r}=[r_{1,1}\ r_{2,1}\ r^*_{1,2}\ r^*_{2,2}]^T$ and the overall channel response matrix $\underline{H}_{all}^{2/2\times 4}$ may be expressed as:

$$\underline{H}_{all}^{2/2\times 4} = \begin{bmatrix} h_{eff,1,1} & h_{eff,1,2} & h_{eff,1,3} & h_{eff,1,4} \\ h_{eff,2,1} & h_{eff,2,2} & h_{eff,2,3} & h_{eff,2,4} \\ -h^*_{eff,1,2} & h^*_{eff,1,1} & -h^*_{eff,1,4} & h^*_{eff,1,3} \\ -h^*_{eff,2,2} & h^*_{eff,2,1} & -h^*_{eff,2,4} & h^*_{eff,2,3} \end{bmatrix}. \quad \text{Eq (16)}$$

As shown in equation (16), the first two rows of $\underline{H}_{all}^{2/2\times 4}$ are equal to $\underline{H}_{eff}^{2/2\times 4}$, and the last two rows of $\underline{H}_{all}^{2/2\times 4}$ contain rearranged and transformed elements of $\underline{H}_{eff}^{2/2\times 4}$.

In general, the received vector $\underline{r}$ for all configurations may be expressed as:

$$\underline{r}=[r_{1,1}\ \ldots\ r_{N_R,1}\ r^*_{1,2}\ \ldots\ r^*_{N_R,2}]^T. \quad \text{Eq (17)}$$

The data vector s is dependent on the configuration used for data transmission. The overall channel response matrix $\underline{H}_{all}$ is dependent on the configuration and the number of receive antennas.

For the 1×2 configuration, the vector s and the matrix $\underline{H}_{all}$ may be expressed as:

$$\underline{s}_{1\times 2} = [s_a\ s_b]^T, \text{ and} \quad \text{Eq (18)}$$

$$\underline{H}_{all}^{1\times 2} = \begin{bmatrix} h_{eff,1,1} & h_{eff,1,2} \\ h_{eff,2,1} & h_{eff,2,2} \\ \vdots & \vdots \\ h_{eff,N_R,1} & h_{eff,N_R,2} \\ -h^*_{eff,1,2} & h^*_{eff,1,1} \\ -h^*_{eff,2,2} & h^*_{eff,2,1} \\ \vdots & \vdots \\ -h^*_{eff,N_R,2} & h^*_{eff,N_R,1} \end{bmatrix}. \quad \text{Eq (19)}$$

For the 2×3 configuration, the vector s and the matrix $\underline{H}_{all}$ may be expressed as:

$$\underline{s}_{2\times 3} = [s_a\ s_b\ s_c\ s_d]^T, \text{ and} \quad \text{Eq (20)}$$

$$\underline{H}_{all}^{2\times 3} = \begin{bmatrix} h_{eff,1,1} & h_{eff,1,2} & h_{eff,1,3} & 0 \\ h_{eff,2,1} & h_{eff,2,2} & h_{eff,2,3} & 0 \\ \vdots & \vdots & \vdots & \vdots \\ h_{eff,N_R,1} & h_{eff,N_R,2} & h_{eff,N_R,3} & 0 \\ -h^*_{eff,1,2} & h^*_{eff,1,1} & 0 & h^*_{eff,1,3} \\ -h^*_{eff,2,2} & h^*_{eff,2,1} & 0 & h^*_{eff,2,3} \\ \vdots & \vdots & \vdots & \vdots \\ -h^*_{eff,N_R,2} & h^*_{eff,N_R,1} & 0 & h^*_{eff,N_R,3} \end{bmatrix}. \quad \text{Eq (21)}$$

For the 2×4 configuration, the vector s and the matrix $\underline{H}_{all}$ may be expressed as:

$$\underline{s}_{2\times 4} = [s_a\ s_b\ s_c\ s_d]^T, \text{ and} \quad \text{Eq (22)}$$

$$\underline{H}_{all}^{2\times 4} = \begin{bmatrix} h_{eff,1,1} & h_{eff,1,2} & h_{eff,1,3} & h_{eff,1,4} \\ h_{eff,2,1} & h_{eff,2,2} & h_{eff,2,3} & h_{eff,2,4} \\ \vdots & \vdots & \vdots & \vdots \\ h_{eff,N_R,1} & h_{eff,N_R,2} & h_{eff,N_R,3} & h_{eff,N_R,4} \\ -h^*_{eff,1,2} & h^*_{eff,1,1} & -h^*_{eff,1,4} & h^*_{eff,1,3} \\ -h^*_{eff,2,2} & h^*_{eff,2,1} & -h^*_{eff,2,4} & h^*_{eff,2,3} \\ \vdots & \vdots & \vdots & \vdots \\ -h^*_{eff,N_R,2} & h^*_{eff,N_R,1} & -h^*_{eff,N_R,4} & h^*_{eff,N_R,3} \end{bmatrix}. \quad \text{Eq (23)}$$

For the 3×4 configuration, the vector s and the matrix $\underline{H}_{all}$ may be expressed as:

$$s_{3\times 4} = [s_a \; s_b \; s_c \; s_d \; s_e \; s_f]^T, \text{ and} \quad \text{Eq (24)}$$

$$H_{all}^{3\times 4} = \begin{bmatrix} h_{\textit{eff},1,1} & h_{\textit{eff},1,2} & h_{\textit{eff},1,3} & 0 & h_{\textit{eff},1,4} & 0 \\ h_{\textit{eff},2,1} & h_{\textit{eff},2,2} & h_{\textit{eff},2,3} & 0 & h_{\textit{eff},2,4} & 0 \\ \vdots & \vdots & \vdots & \vdots & \vdots & \vdots \\ h_{\textit{eff},N_R,1} & h_{\textit{eff},N_R,2} & h_{\textit{eff},N_R,3} & 0 & h_{\textit{eff},N_R,4} & 0 \\ -h^*_{\textit{eff},1,2} & h^*_{\textit{eff},1,1} & 0 & h^*_{\textit{eff},1,3} & 0 & h^*_{\textit{eff},1,4} \\ -h^*_{\textit{eff},2,2} & h^*_{\textit{eff},2,1} & 0 & h^*_{\textit{eff},2,3} & 0 & h^*_{\textit{eff},2,4} \\ \vdots & \vdots & \vdots & \vdots & \vdots & \vdots \\ -h^*_{\textit{eff},N_R,2} & h^*_{\textit{eff},N_R,1} & 0 & h^*_{\textit{eff},N_R,3} & 0 & h^*_{\textit{eff},N_R,4} \end{bmatrix}. \quad \text{Eq (25)}$$

The multi-antenna receiving entity can derive estimates of the transmitted data symbols using various receiver spatial processing techniques. These techniques include an MMSE technique, a CCMI technique (which is also commonly called a zero-forcing technique or a decorrelation technique), a partial-MMSE technique, and a partial-CCMI technique. For the MMSE and CCMI techniques, the receiving entity performs spatial matched filtering on $2N_R$ received symbols obtained in each 2-symbol interval. For the partial-MMSE and partial-CCMI techniques, the receiving entity performs spatial matched filtering on $N_R$ received symbols obtained in each symbol period.

A. MMSE Receiver

For the MMSE technique, the receiving entity derives a spatial filter matrix as follows:

$$M_{mmse} = [\hat{H}_{all}^H \cdot \hat{H}_{all} + \varphi_{nn}]^{-1} \cdot \hat{H}_{all}^H, \quad \text{Eq (26)}$$
$$= [\hat{H}_{all}^H \cdot \hat{H}_{all} + \sigma_n^2 I]^{-1} \cdot \hat{H}_{all}^H,$$

where $\hat{H}_{all}$ is a $2N_R \times 2N_D$ matrix that is an estimate of $H_{all}$;
$\varphi_{nn}$ is an autocovariance matrix of the noise vector $n_{all}$ in equation (10); and
$M_{mmse}$ is a $2N_D \times 2N_R$ MMSE spatial filter matrix.

The receiving entity may derive $\hat{H}_{all}$ in different manners depending on how pilot symbols are sent by the transmitting entity. For example, the receiving entity may obtain $\hat{H}_{\textit{eff}}$, which is an estimate the effective channel response matrix $H_{\textit{eff}}$, based on received pilot symbols. The receiving entity may then derive $\hat{H}_{all}$ based on $\hat{H}_{\textit{eff}}$ as shown in equation (19), (21), (23) or (25) for the four configurations given in Table 1. The receiving entity may also estimate the overall channel response matrix $H_{all}$ directly based on received pilot symbols. In any case, the second equality in equation (26) assumes that the noise vector $n_{all}$ is AWGN with zero mean and variance of $\sigma_n^2$. The spatial filter matrix $M_{mmse}$ minimizes the mean square error between the symbol estimates from the spatial filter matrix and the data symbols.

The receiving entity performs MMSE spatial processing as follows:

$$\hat{s}_{mmse} = D \cdot M_{mmse} \cdot r, \quad \text{Eq (27)}$$
$$= D \cdot M_{mmse} \cdot [H_{all} \cdot s + n_{all}],$$
$$= D \cdot Q \cdot s + n_{mmse},$$

where $\hat{s}_{mmse}$ is a $2N_D \times 1$ vector with $2N_D$ detected symbols obtained for a 2-symbol interval with the MMSE technique;
$Q = M_{mmse} \cdot H_{all}$;
$D = [\text{diag}[Q]]^{-1}$ is a $2N_D \times 2N_D$ diagonal matrix; and
$n_{mmse}$ is the MMSE filtered noise.

The symbol estimates from the spatial filter matrix $M_{mmse}$ are unnormalized estimates of the data symbols. The multiplication with the scaling matrix $D$ provides normalized estimates of the data symbols.

B. CCMI Receiver

For the CCMI technique, the receiving entity derives a spatial filter matrix as follows:

$$M_{ccmi} = [\hat{H}_{all}^H \cdot \hat{H}_{all}]^{-1} \cdot \hat{H}_{all}^H = \hat{R}_{all}^{-1} \cdot \hat{H}_{all}^H, \quad \text{Eq (28)}$$

where $M_{ccmi}$ is a $2N_D \times 2N_R$ CCMI spatial filter matrix.

The receiving entity performs CCMI spatial processing as follows:

$$\hat{s}_{ccmi} = M_{ccmi} \cdot r, \quad \text{Eq (29)}$$
$$= \hat{R}_{all}^{-1} \cdot \hat{H}_{all}^H \cdot [H_{all} \cdot s + n_{all}],$$
$$= s + n_{ccmi},$$

where $\hat{s}_{ccmi}$ is a $2N_D \times 1$ vector with $2N_D$ detected symbols obtained for a 2-symbol interval with the CCMI technique; and
$n_{ccmi}$ is the CCMI filtered noise.

C. Partial-MMSE Receiver

For the partial-MMSE and partial-CCMI techniques, the receiving entity performs spatial matched filtering on the $N_R$ received symbols for each symbol period based on a spatial filter matrix for that symbol period. For each STTD encoded data symbol stream, the receiving entity obtains two estimates in two symbol periods for each data symbol sent in the stream and combines these two estimates to generate a single estimate for the data symbol. The partial-MMSE and partial-CCMI techniques may be used if the receiving entity is equipped with at least $N_C$ receive antennas, or $N_R \geq N_C$. There should be at least as many receive antennas as the number of coded symbols transmitted at each symbol period, which is shown in Table 1.

For the partial-MMSE technique, the receiving entity derives a spatial filter matrix as follows:

$$\underline{M}_{p-mmse} = [\hat{\underline{H}}_{eff}^H \cdot \hat{\underline{H}}_{eff} + \underline{\varphi}_{nn}]^{-1} \cdot \hat{\underline{H}}_{eff}^H, \quad \text{Eq (30)}$$

$$= [\hat{\underline{H}}_{eff}^H \cdot \hat{\underline{H}}_{eff} + \sigma_n^2 \underline{I}]^{-1} \cdot \hat{\underline{H}}_{eff}^H,$$

where $\hat{\underline{H}}_{eff}$ is an $N_R \times N_C$ matrix that is an estimate of $\underline{H}_{eff}$; and
$\underline{M}_{p-mmse}$ is an $N_C \times N_R$ MMSE spatial filter matrix for one symbol period.

The effective channel response matrix $\underline{H}_{eff}$ is dependent on the configuration used for data transmission and has the form shown in equation (8).

The receiving entity performs MMSE spatial processing for each symbol period as follows:

$$\hat{\underline{s}}_{mmse,t} = \underline{D}_{p-mmse} \cdot \underline{M}_{p-mmse} \cdot \underline{r}_t, \quad \text{Eq (31)}$$

$$= \underline{D}_{p-mmse} \cdot \underline{M}_{p-mmse} \cdot [\underline{H}_{eff} \cdot \underline{s}_t + \underline{n}_t],$$

$$= \underline{D}_{p-mmse} \cdot \underline{Q}_{p-mmse} \cdot \underline{s}_t + \underline{n}_{mmse,t},$$

for $t = 1, 2$, where $\hat{\underline{s}}_{mmse,t}$ is an $N_C \times 1$ vector with $N_C$ detected symbols obtained in symbol period t with the partial-MMSE technique;

$\underline{Q}_{p-mmse} = \underline{M}_{p-mmse} \cdot \underline{H}_{eff}$;
$\underline{D}_{p-mmse} = [\text{diag}[\underline{Q}_{p-mmse}]]^{-1}$ is an $N_C \times N_C$ diagonal matrix; and $\underline{n}_{mmse,t}$ is the MMSE filtered noise for symbol period t.

The partial-MMSE processing provides two vectors $\hat{\underline{s}}_{mmse,1}$ and $\hat{\underline{s}}_{mmse,2}$ for the first and second symbol periods, respectively, which are estimates of vectors $\underline{s}_1$ and $\underline{s}_2$, respectively. The detected symbols in vector $\hat{\underline{s}}_{mmse,2}$ are conjugated and/or negated, as needed, to obtain estimates of the data symbols included in vector $\underline{s}_2$. As an example, for the 2×3 configuration, $\hat{\underline{s}}_{mmse,1} = [\hat{s}_a \, \hat{s}_b \, \hat{s}_c]^T$ and $\hat{\underline{s}}_{mmse,2} = [\hat{s}^*_b \, -\hat{s}^*_a \, \hat{s}^*_d]^T$. For vector $\hat{\underline{s}}_{mmse,2}$, $\hat{s}^*_b$ is conjugated to obtain a second estimate of $s_b$, $-\hat{s}^*_a$ is negated and conjugated to obtain a second estimate of $s_a$, and $\hat{s}^*_d$ is conjugated to obtain an estimate of $s_d$.

For each STTD encoded data symbol stream, the partial-MMSE processing provides two detected symbols in two symbol periods for each data symbol sent in that stream. In particular, the partial-MMSE processing provides two estimates of $s_a$ and two estimates of $s_b$ for all four configurations in Table 1 and further provides two estimates of $s_c$ and two estimates of $s_d$ for the 2×4 configuration. The two estimates of each data symbol may be combined to generate a single estimate of that data symbol.

The two estimates of a data symbol $s_m$ may be combined using maximal ratio combining (MRC), as follows:

$$\hat{s}_m = \frac{\gamma_{m,1} \cdot \hat{s}_{m,1} + \gamma_{m,2} \cdot \hat{s}_{m,2}}{\gamma_{m,1} + \gamma_{m,2}}, \quad \text{Eq (32)}$$

where $\hat{s}_{m,t}$ is an estimate of data symbol $s_m$ obtained in symbol period t;

$\gamma_{m,t}$ is the SNR of $\hat{s}_{m,t}$; and
$\hat{s}_m$ is a final estimate of data symbol $s_m$.

The estimate $\hat{s}_{m,1}$ is obtained from coded symbol stream $m_1$ in symbol period t=1, and the estimate $\hat{s}_{m,2}$ is obtained from coded symbol stream $m_2$ in symbol period t=2. The SNR of $\hat{s}_{m,t}$ for the partial-MMSE technique may be expressed as:

$$\gamma_{m,t} = \frac{q_{m_t,m_t}}{1 - q_{m_t,m_t}}, \text{ for } t = 1, 2, \quad \text{Eq (33)}$$

where $m_t$ is the coded symbol stream from which $\hat{s}_{m,t}$ was obtained; and
$q_{m_t,m_t}$ is the $m_t$-th diagonal element of $\underline{Q}_{p-mmse}$ defined above for equation (31).

The two estimates of data symbol $S_m$ may also be linearly combined, as follows:

$$\hat{s}_m = \frac{\hat{s}_{m,1} + \hat{s}_{m,2}}{2}. \quad \text{Eq (34)}$$

Equation (34) provides the same performance as the MRC technique if the SNRs of the two estimates $\hat{s}_{m,1}$ and $\hat{s}_{m,2}$ are equal but provides sub-optimal performance if the SNRs are not equal.

D. Partial-CCMI Receiver

For the partial-CCMI technique, the receiving entity derives a spatial filter matrix for one symbol period as follows:

$$\underline{M}_{p-ccmi} = [\hat{\underline{H}}_{eff}^H \cdot \hat{\underline{H}}_{eff}]^{-1} \cdot \hat{\underline{H}}_{eff}^H = \hat{\underline{R}}_{eff}^{-1} \cdot \hat{\underline{H}}_{eff}^H, \quad \text{Eq (35)}$$

where $\underline{M}_{p-ccmi}$ is an $N_C \times N_R$ CCMI spatial filter matrix for one symbol period.

The receiving entity performs CCMI spatial processing for each symbol period as follows:

$$\hat{\underline{s}}_{ccmi,t} = \underline{M}_{p-ccmi} \cdot \underline{r}_t, \quad \text{Eq (36)}$$

$$= \hat{\underline{R}}_{eff}^{-1} \cdot \hat{\underline{H}}_{eff}^H \cdot [\underline{H}_{eff} \cdot \underline{s}_t + \underline{n}_t], \text{ for } t = 1, 2,$$

$$= \underline{s}_t + \underline{n}_{ccmi,t},$$

where $\hat{\underline{s}}_{ccmi,t}$ is an $N_C \times 1$ vector with $N_C$ detected symbols obtained in symbol period t with the partial-CCMI technique; and
$\underline{n}_{ccmi,t}$ is the CCMI filtered noise for symbol period t.

The receiving entity may combine two estimates of a given data symbol using MRC, as shown in equation (32). In this case, the SNR of detected symbol $\hat{s}_{m,t}$ for the CCMI technique may be expressed as:

$$\gamma_{m,t} = \frac{1}{r_{m_t,m_t} \cdot \sigma_n^2}, \text{ for } t = 1, 2, \quad \text{Eq (37)}$$

where $r_{m_t,m_t}$ is the $m_t$-th diagonal element of $\hat{\underline{R}}_{eff}^{-1}$.

The partial-MMSE and partial-CCMI techniques may reduce delay (or latency) for data symbol streams sent without STTD. The partial-MMSE and partial-CCMI techniques may also reduce complexity of the spatial matched filtering since the spatial filter matrix for each symbol period has dimension of $N_C \times N_R$ whereas the spatial filter matrix for each 2-symbol period interval has dimension of $2N_D \times 2N_R$.

4. Alternate STTD Encoding Scheme

For clarity, the description above is for the case in which a pair of data symbols $s_a$ and $s_b$ is STTD encoded into two vectors $\underline{s}_1 = [s_a \ s_b]^T$ and $\underline{s}_2 = [s^*_b \ -s^*_a]^T$. As noted above, the pair of data symbols $s_a$ and $s_b$ may also be STTD encoded into two vectors is $\underline{s}_1 = [s_a \ -s^*_b]^T$ and $\underline{s}_2 = [s_b \ s^*_a]^T$. The various vectors and matrices described above may be different for this alternate STTD encoding scheme.

As an example, for the 2×4 configuration, the transmitting entity may generate vectors is $\underline{s}_1 = [s_a \ -s^*_b \ s_c \ -s^*_d]^T$ and $\underline{s}_2 = [s_b \ s^*_a \ s_d \ s^*_c]^T$ for two pairs of data symbols ($s_a$ and $s_b$) and ($s_c$ and $s_d$) to be sent in two symbol periods for two data symbol streams. The data vector $\underline{s}$ may be given as $\underline{s} = [s_a \ s^*_b \ s_c \ s^*_d]^T$, the received vector $\underline{r}$ may be given as $\underline{r} = [r_{1,1} \ldots r_{N_R,1} \ r^*_{1,2} \ldots r^*_{N_R,2}]^T$, and the overall channel response matrix $\underline{H}_{all}$ may be expressed as:

$$\underline{H}_{all}^{2 \times 4} = \begin{bmatrix} h_{\mathit{eff},1,1} & -h_{\mathit{eff},1,2} & h_{\mathit{eff},1,3} & -h_{\mathit{eff},1,4} \\ h_{\mathit{eff},2,1} & -h_{\mathit{eff},2,2} & h_{\mathit{eff},2,3} & -h_{\mathit{eff},2,4} \\ \vdots & \vdots & \vdots & \vdots \\ h_{\mathit{eff},N_R,1} & -h_{\mathit{eff},N_R,2} & h_{\mathit{eff},N_R,3} & -h_{\mathit{eff},N_R,4} \\ h^*_{\mathit{eff},1,2} & h^*_{\mathit{eff},1,1} & h^*_{\mathit{eff},1,4} & h^*_{\mathit{eff},1,3} \\ h^*_{\mathit{eff},2,2} & h^*_{\mathit{eff},2,1} & h^*_{\mathit{eff},2,4} & h^*_{\mathit{eff},2,3} \\ \vdots & \vdots & \vdots & \vdots \\ h^*_{\mathit{eff},N_R,2} & h^*_{\mathit{eff},N_R,1} & h^*_{\mathit{eff},N_R,4} & h^*_{\mathit{eff},N_R,3} \end{bmatrix} \quad \text{Eq (38)}$$

The vectors $\underline{s}_1$, $\underline{s}_2$ and $\underline{s}$ and the matrix $\underline{H}_{all}$ for the other configurations may be derived in similar manner as described above for the 2×4 configuration.

For the alternate STTD encoding scheme, the receiving entity uses the matrix $\underline{H}_{all}$ defined for the alternate STTD encoding scheme, instead of the matrix $\underline{H}_{all}$ defined for first STTD encoding scheme, to derive an MMSE spatial filter matrix or a CCMI spatial filter matrix. For the 2×4 configuration, the matrix $\underline{H}_{all}$ shown in equation (38) is used instead of the matrix $\underline{H}_{all}$ shown in equation (23). The receiving entity then performs spatial matched filtering on the received vector $\underline{r}$ with the spatial filter matrix to obtain $\hat{\underline{s}}$, which is an estimate of $\underline{s}$ for the alternate STTD encoding scheme. The receiving entity then conjugates the symbols in $\hat{\underline{s}}$, as needed, to obtain the recovered data symbols.

In general, the overall channel response matrix $\underline{H}_{all}$ is dependent on the manner in which the STTD encoding is performed by the transmitting entity and any other spatial processing performed by the transmitting entity. The receiving entity performs MMSE or CCMI processing in the same manner, albeit with the overall channel response matrix derived in the proper manner.

The effective channel response matrix $\underline{H}_{\mathit{eff}}$ is the same for both STTD encoding schemes and is shown in equation (8). The receiving entity uses $\underline{H}_{\mathit{eff}}$ to derive a partial-MMSE spatial filter matrix or a partial-CCMI spatial filter matrix. The receiving entity then performs spatial matched filtering on the received vector $\underline{r}_t$ for each symbol period with the spatial filter matrix to obtain $\hat{\underline{s}}_t$, which is an estimate of $\underline{s}_t$ for the alternate STTD encoding scheme. The receiving entity then conjugates the detected symbols in $\hat{\underline{s}}_t$ as needed and further combines estimates as appropriate to obtain the recovered data symbols.

5. Receiver Processing

Figure 3:
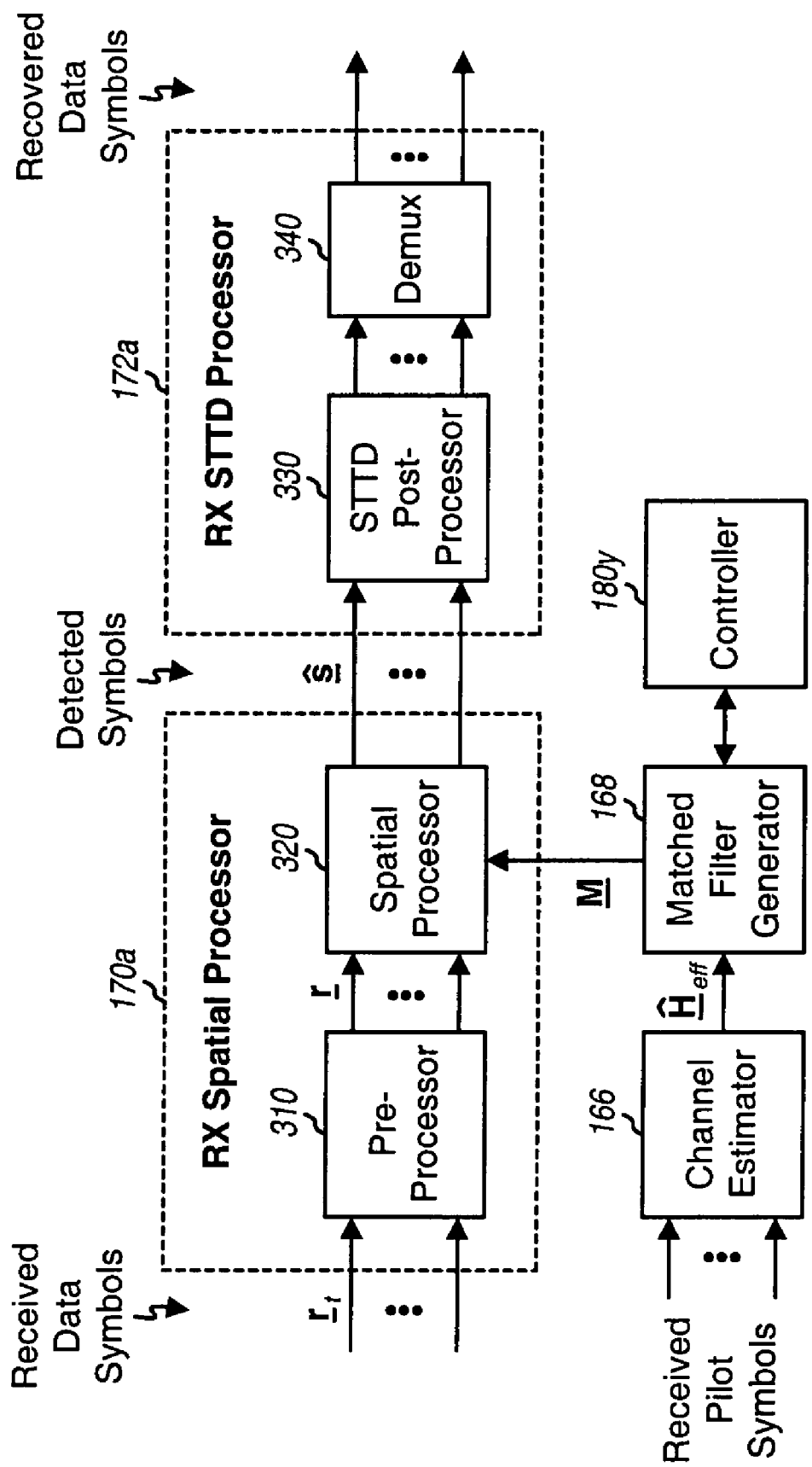
FIG. 3 shows a block diagram of a receive (RX) spatial processor and an RX STTD processor for the MMSE and CCMI techniques.

FIG. 3 shows a block diagram of an RX spatial processor 170a and an RX STTD processor 172a, which can implement the MMSE or CCMI technique. RX spatial processor 170a and RX STTD processor 172a are one embodiment of RX spatial processor 170 and RX STTD processor 172, respectively, for multi-antenna receiving entity 150y in FIG. 2. Channel estimator 166 derives the effective channel response estimate $\hat{\underline{H}}_{\mathit{eff}}$ based on received pilot symbols, as described below. Matched filter generator 168 forms the overall channel response estimate $\hat{\underline{H}}_{all}$ based on $\hat{\underline{H}}_{\mathit{eff}}$ and derives an MMSE or CCMI spatial filter matrix $\underline{M}$ for a 2-symbol interval based on $\hat{\underline{H}}_{all}$, as shown in equation (26) or (28).

Within RX spatial processor 170a, a pre-processor 310 obtains the received vector $\underline{r}_t$ for each symbol period, conjugates the received symbols for the second symbol period of each 2-symbol interval, and forms the received vector $\underline{r}$ for each 2-symbol interval, as shown in equation (17). A spatial processor 320 performs spatial matched filtering on the received vector $\underline{r}$ with the spatial filter matrix $\underline{M}$ and provides vector $\hat{\underline{s}}$, as shown in equation (27) or (29). Within RX STUD processor 172a, an STTD post-processor 330 conjugates the symbols in vector $\hat{\underline{s}}$, as needed, and provides $2N_D$ recovered data symbols for each 2-symbol interval. A demultiplexer (Demux) 340 demultiplexes the recovered data symbols from STUD post-processor 330 onto $N_D$ recovered data symbol streams and provides these streams to RX data processor 174.

Figure 4:
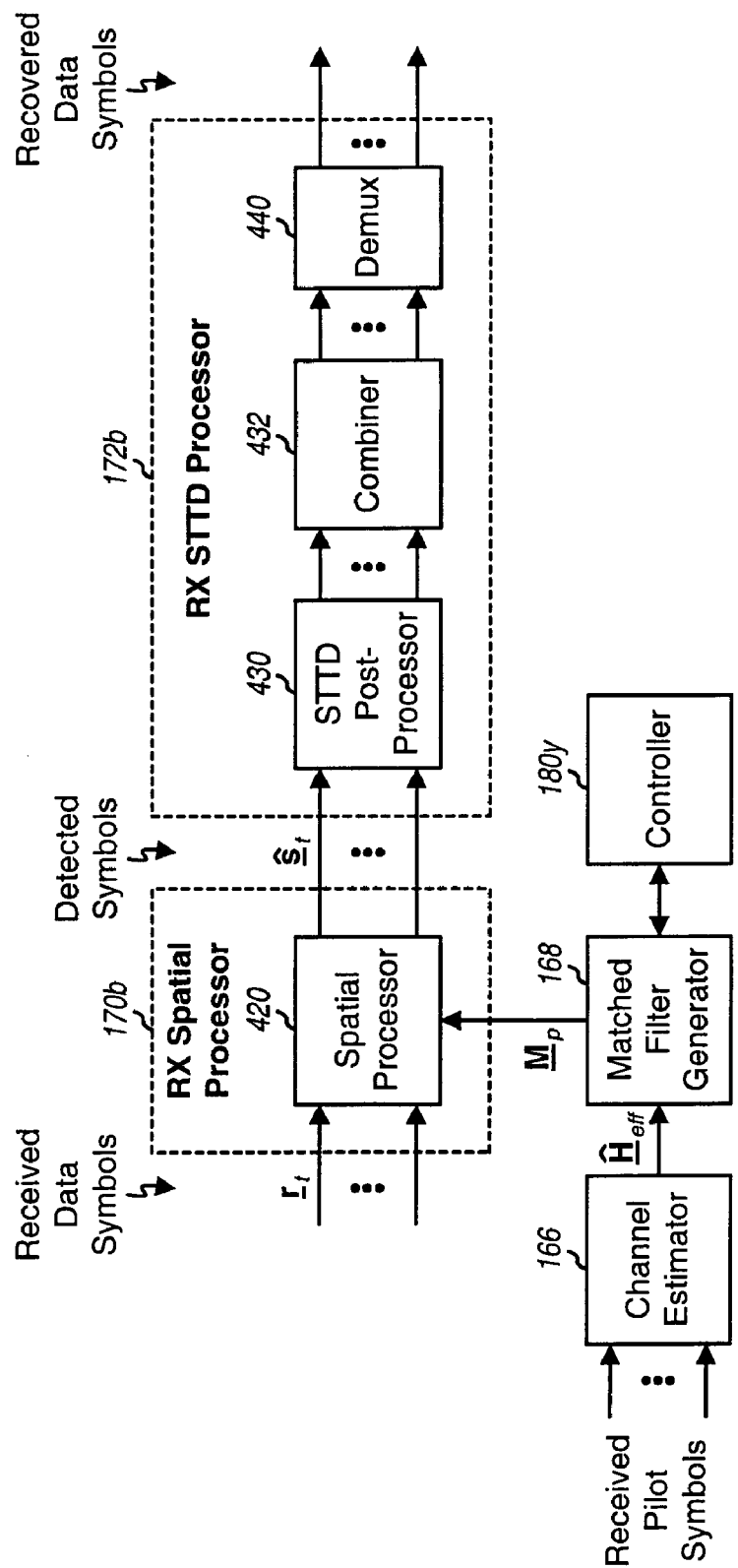
FIG. 4 shows a block diagram of an RX spatial processor and an RX STTD processor for the partial-MMSE and partial-CCMI techniques.

FIG. 4 shows a block diagram of an RX spatial processor 170b and an RX STTD processor 172b, which can implement the partial-MMSE or partial-CCMI technique. RX spatial processor 170b and RX STTD processor 172b are another embodiment of RX spatial processor 170 and RX STTD processor 172, respectively. Channel estimator 166 derives the effective channel response estimate $\hat{\underline{H}}_{\mathit{eff}}$. Matched filter generator 168 generates a partial-MMSE or partial-CCMI spatial filter matrix $\underline{M}_p$ for one symbol period based on $\hat{\underline{H}}_{\mathit{eff}}$, as shown in equation (30) or (35).

Within RX spatial processor 170b, a spatial processor 420 performs spatial matched filtering on the received vector $\underline{r}_t$ for each symbol period with the spatial filter matrix $\underline{M}_p$ for that symbol period and provides vector $\hat{\underline{s}}_t$, as shown in equation (31) or (36). Within RX STTD processor 172b, an STTD post-processor 430 conjugates the detected symbols in vector $\hat{\underline{s}}_t$, as needed, and provides $N_C$ data symbol estimates for each symbol period. A combiner 432 combines two estimates for each data symbol sent with STTD, e.g., as shown in equation (32) or (34), and provides a single estimate for that data symbol. A demultiplexer 440 demultiplexes the recovered data symbols from combiner 432 onto $N_D$ recovered data symbol streams and provides these streams to RX data processor 174.

FIG. 5 shows a process 500 for receiving a data transmission with the MMSE or CCMI technique. Received symbols are obtained for the data transmission, which includes at least one STTD encoded data symbol stream (block 510). An effective channel response matrix is obtained, e.g., based on received pilot symbols (block 512). An overall channel response matrix is formed based on the effective channel response matrix and in accordance with the STUD encoding scheme used for the data transmission (block 514). A spatial filter matrix is derived based on the overall channel response matrix and in accordance with, e.g., the MMSE or CCMI technique (block 516). A vector of received symbols is formed for each 2-symbol interval (block 518). Spatial processing is performed on the vector of received symbols for each 2-symbol interval with the spatial filter matrix to obtain a vector of detected symbols for the 2-symbol interval (block 520). Post-processing (e.g., conjugation) is performed on the detected symbols, if needed, to obtain recovered data symbols (block 522).

FIG. 6 shows a process 600 for receiving a data transmission with the partial-MMSE or partial-CCMI technique. Received symbols are obtained for the data transmission, which includes at least one STTD encoded data symbol stream (block 610). An effective channel response matrix is obtained, e.g., based on received pilot symbols (block 612). A spatial filter matrix is derived based on the effective channel response matrix and in accordance with, e.g., the MMSE or CCMI technique (block 614). Spatial processing is performed on the received symbols for each symbol period with the spatial filter matrix to obtain detected symbols for the symbol period (block 616). Post-processing (e.g., conjugation) is performed on the detected symbols, if needed, to obtain estimates of data symbols (block 618). Multiple estimates of each data symbol sent with STTD are combined to obtain a single estimate for the data symbol (block 620).

6. SFTD and Spatial Spreading

The transmitting entity may also use a combination of SFTD, spatial spreading, and possibly continuous beamforming. For each configuration shown in Table 1, the transmitting entity may generate two vectors $s_1$ and $s_2$ for $2N_D$ data symbols to be sent on two subbands in one symbol period for $N_D$ data symbol streams. The transmitting entity may spatially spread and send vector $s_1$ on one subband in one symbol period and spatially spread and send vector $s_2$ on another subband in the same symbol period. The two subbands are typically adjacent subbands. The receiving entity may derive the overall channel response matrix $H_{all}$ as described above, except that the first $N_R$ rows of $H_{all}$ are for the first subband (instead of the first symbol period) and the last $N_R$ rows of $H_{all}$ are for the second subband (instead of the second symbol period). The receiving entity may perform MMSE, CCMI, partial-MMSE, or partial-CCMI processing in the manner described above.

7. Steering Matrices for Spatial Spreading

Various types of steering matrices may be used for spatial spreading. For example, the steering matrix $V$ may be a Walsh matrix, a Fourier matrix, or some other matrix. A 2×2 Walsh matrix $\underline{W}_{2\times 2}$ be expressed as $$\underline{W}_{2\times 2} = \begin{bmatrix} 1 & 1 \\ 1 & -1 \end{bmatrix}.$$

A larger size Walsh matrix $\underline{W}_{2N\times 2N}$ may be formed from a smaller size Walsh matrix $\underline{W}_{N\times N}$, as follows:

$$\underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}. \quad \text{Eq (39)}$$

An N×N Fourier matrix $\underline{D}_{N\times N}$ has element $d_{n,m}$ in the n-th row of the m-th column, which may be expressed as:

$$d_{n,m} = e^{-j2\pi \frac{(n-1)(m-1)}{N}}, \text{ for } n=1\ldots N \text{ and } m=1\ldots N. \quad \text{Eq (40)}$$

Fourier matrices of any square dimension (e.g., 2, 3, 4, 5, and so on) may be formed.

A Walsh matrix $\underline{W}_{N\times N}$, a Fourier matrix $\underline{D}_{N\times N}$, or any other matrix may be used as a base matrix $\underline{B}_{N\times N}$ to form other steering matrices. For an N×N base matrix, each of rows 2 through N of the base matrix may be independently multiplied with one of M different possible scalars. $M^{N-1}$ different steering matrices may be obtained from $M^{N-1}$ different permutations of the M scalars for the N−1 rows. For example, each of rows 2 through N may be independently multiplied with a scalar of +1, −1, +j, or −j, where $j=\sqrt{-1}$. For N=4, 64 different steering matrices may be generated from a base matrix $\underline{B}_{4\times 4}$ with the four different scalars. Additional steering matrices may be generated with other scalars, e.g., $e^{\pm j3\pi/4}$, $e^{\pm j\pi/4}$, $e^{\pm j\pi/8}$, and so on. In general, each row of the base matrix may be multiplied with any scalar having the form $e^{j\theta}$, where $\theta$ may be any phase value. N×N steering matrices may be generated from the N×N base matrix as $\underline{V}(i)=g_N \cdot \underline{B}_{N\times N}^i$, where $g_N=1/\sqrt{N}$ and $\underline{B}_{N\times N}^i$ is the i-th steering matrix generated with the base matrix $\underline{B}_{N\times N}$. The scaling by $g_N=1/\sqrt{N}$ ensures that each column of $\underline{V}(i)$ has unit power.

The steering matrices may also be generated in a pseudo-random manner. The steering matrices are typically unitary matrices having columns that are orthogonal to one another. The steering matrices may also be orthonormal matrices having orthogonal columns and unit power for each column, so that $\underline{V}^H \cdot \underline{V}=\underline{I}$, and $\underline{I}$ is the identity matrix. A steering matrix of a dimension that is not square may be obtained by deleting one or more columns of a square steering matrix.

Different steering matrices may be used for different time intervals. For example, different steering matrices may be used for different symbol periods for SFTD and for different 2-symbol intervals for STTD and OTD. For an OFDM system, different steering matrices may be used for different subbands for STTD and OTD and for different pairs of subbands for SFTD. Different steering matrices may also be used for different subbands and different symbol periods. The randomization provided by spatial spreading (across time and/or frequency) with the use of different steering matrices can mitigate deleterious effects of a wireless channel.

8. Frame Structure and MIMO Pilot

Figure 7:
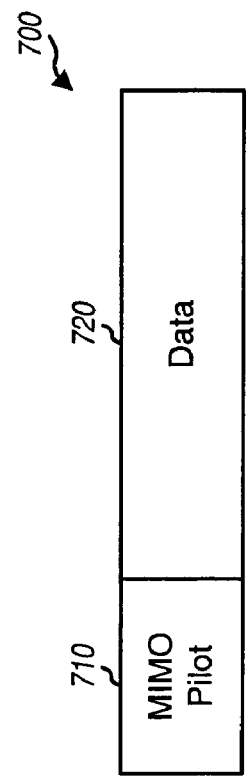
FIG. 7 shows an exemplary protocol data unit (PDU).

FIG. 7 shows an exemplary protocol data unit (PDU) 700 that supports MISO and MIMO transmissions. PDU 700 includes a section 710 for a MIMO pilot and a section 720 for data. PDU 700 may also include other sections, e.g., for a preamble, signaling, and so on. A MIMO pilot is a pilot that is sent from all transmit antennas used for data transmission and allows a receiving entity to estimate the MISO or MIMO channel used for data transmission. The MIMO pilot may be transmitted in various manners.

In an embodiment, the transmitting entity transmits a "clear" MIMO pilot (i.e., without spatial spreading) from all $N_T$ transmit antennas, as follows:

$$\underline{x}_{pilot}^{ns}(k,t)=\underline{W}(t) \cdot \underline{p}(k), \text{ for } t=1\ldots L, \quad \text{Eq (41)}$$

where $\underline{p}(k)$ is an $N_T \times 1$ vector with $N_T$ pilot symbols sent on subband k;

$\underline{W}(t)$ is an $N_T \times N_T$ diagonal Walsh matrix for symbol period t; and $\underline{x}_{pilot}^{ns}(k,t)$ is an $N_T \times 1$ vector with $N_T$ spatially processed symbols for the clear MIMO pilot for subband k in symbol period t.

The $N_T$ transmit antennas may be assigned $N_T$ different Walsh sequences of length L, where $L \geq N_T$. Each Walsh sequence corresponds to one diagonal element of $\underline{W}(t)$. Alternatively, the transmitting entity may generate the clear MIMO pilot as: $\underline{x}_{pilot}^{ns}(k,t)=\underline{w}(t) \cdot p(k)$, where $p(k)$ is a scalar for a pilot symbol, and $\underline{w}(t)$ is an $N_T \times 1$ vector with the Walsh sequences assigned to the $N_T$ transmit antennas. For simplicity, the continuous beamforming is not shown in equation (41) but is typically performed in the same manner, if at all, for both pilot and data transmission. The MIMO channel is assumed to be constant over the length of the Walsh sequences.

The received pilot symbols obtained by the receiving entity for the clear MIMO pilot may be expressed as:

$$\underline{r}_{pilot}^{ns}(k,t)=\underline{H}(k)\cdot\underline{W}(t)\cdot\underline{p}(k)+\underline{n}(k), \text{ for } t=1\ldots L, \quad \text{Eq (42)}$$

where $\underline{r}_{pilot}^{ns}(k,t)$ is an $N_R \times 1$ vector with $N_R$ received pilot symbols for the clear MIMO pilot for subband k in symbol period t.

The receiving entity may derive an estimate of the MIMO channel matrix H(k) based on the clear MIMO pilot. Each column of $\underline{H}(k)$ is associated with a respective Walsh sequence. The receiving entity may obtain an estimate of $h_{j,i}(k)$, which is the channel gain between the i-th transmit antenna and the j-th receive antenna, as follows. The receiving entity first multiplies the j-th element of $\underline{r}_{pilot}^{ns}(k,1)$ through $\underline{r}_{pilot}^{ns}(k,L)$ by the L chips of Walsh sequence $W_i$ assigned to the i-th transmit antenna and obtains a sequence of L recovered symbols. The receiving entity then removes the modulation used for pilot symbol $p_i(k)$, which is the i-th element of p(k), from the L recovered symbols. The receiving entity then accumulates the L resultant symbols to obtain the estimate of $h_{j,i}(k)$, which is the element in the j-th row and the i-th column of H(k). The process is repeated for each of the elements of $\underline{H}(k)$. The receiver entity may then derive an estimate of $\underline{\bar{H}}_{eff}(k)$ based on $\hat{H}(k)$ and the known steering matrices used by the transmitting entity. The receiving entity may use $\hat{H}(k)$ for receiver spatial processing, as described above.

The transmitting entity may send a spatially spread MIMO pilot, as follows:

$$\underline{x}_{pilot}^{ss}(k,t)=\underline{V}(k)\cdot\underline{W}(t)\cdot\underline{p}(k), \text{ for } t=1\ldots L, \quad \text{Eq (43)}$$

where p(k) is an $N_C \times 1$ vector with $N_C$ pilot symbols to be sent on subband k;

W(t) is an $N_C \times N_C$ diagonal Walsh matrix for symbol period t;

V(k) is an $N \times N_C$ steering matrix for spatial spreading for subband k; and $\underline{x}_{pilot}^{ss}(k,t)$ is an $N_T \times 1$ vector with $N_T$ spatially processed symbols for the spatially spread MIMO pilot for subband k in symbol period t.

The Walsh sequences have length of L, where $L \geq N_C$ for the spatially spread MIMO pilot. Alternatively, the transmitting entity may generate the spatially spread MIMO pilot as: $\underline{x}_{pilot}^{ss}(k,t)=\underline{V}(k)\cdot\underline{w}(t)\cdot p(k)$, where p(k) and w(t) are described above.

The received pilot symbols obtained by the receiving entity for the spatially spread MIMO pilot may be expressed as:

$$\underline{r}_{pilot}^{ss}(k,t)=\underline{H}(k)\cdot\underline{V}(k)\cdot\underline{W}(t)\cdot\underline{p}(k)+\underline{n}(k), \quad \text{Eq (44)}$$

where $\underline{r}_{pilot}^{ss}(k,t)$ is an $N_R \times 1$ vector with $N_R$ received pilot symbols for the spatially spread MIMO pilot for subband k in symbol period t.

The receiving entity may derive an estimate of the effective MIMO channel $\underline{H}_{eff}(k)$ based on the received pilot symbols in $\underline{r}_{pilot}^{ss}(k,t)$, e.g., as described above for the clear MIMO pilot. In this case, the receiving entity removes p(k) and W(t) and obtains $\hat{\underline{H}}_{eff}(k)$, which is an estimate of $\underline{H}(k)\cdot\underline{V}(k)$. Alternatively, the transmitting entity may generate a spatially spread MIMO pilot as: $\underline{x}_{pilot}^{ss}(k,t)=\underline{W}(t)\cdot\underline{p}(k)$ or $\underline{x}_{pilot}^{ss}(k,t)=\underline{w}(t)\cdot p(k)$, where W(t) or w(t) performs the spatial spreading. In this case, the receiving entity may form $\hat{\underline{H}}_{eff}(k)$, which is an estimate of $\underline{H}(k)\cdot\underline{W}(k)$, directly based on the received pilot symbols without any extra processing. In any case, the receiving entity may use $\hat{\underline{H}}_{eff}(k)$ for receiver spatial processing.

In another embodiment, the transmitting entity transmits a clear or spatially spread MIMO pilot using subband multiplexing. With subband multiplexing, only one transmit antenna is used for each subband in each symbol period. The Walsh matrix W(t) is not needed.

The data transmission and reception techniques described herein may be implemented by various means. For example, these techniques may be implemented in hardware, software, or a combination thereof. For a hardware implementation, the processing units at a transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a receiving entity may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 142 in FIG. 1, or memory unit 182*x* or 182*y* in FIG. 2) and executed by a processor (e.g., controller 140 in FIG. 1, or controller 180*x* or 180*y* in FIG. 2). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data in a wireless communication system, comprising:

obtaining received symbols for a data transmission comprising at least one data symbol stream sent with space-time transmit diversity (STTD);

obtaining an effective channel response matrix for the data transmission;

deriving a spatial filter matrix with the effective channel response matrix; and performing spatial processing on the received symbols, based on a 2-symbol interval corresponding to the received symbols, with the spatial filter matrix to obtain detected symbols.

2. The method of claim 1, wherein the obtaining the effective channel response matrix comprises receiving pilot symbols sent with the data transmission, and deriving the effective channel response matrix based on the received pilot symbols.

3. The method of claim 1, wherein the obtaining the effective channel response matrix comprises
receiving pilot symbols sent with spatial spreading, and
deriving the effective channel response matrix based on the received pilot symbols.

4. The method of claim 1, wherein the obtaining the effective channel response matrix comprises
receiving pilot symbols sent with spatial spreading and continuous beam forming, and
deriving the effective channel response matrix based on the received pilot symbols.

5. The method of claim 1, further comprising:
forming an overall channel response matrix based on the effective channel response matrix and in accordance with an STTD encoding scheme used for the data transmission.

6. The method of claim 5, wherein the deriving the spatial filter matrix comprises
forming the spatial filter matrix based on the overall channel response matrix and in accordance with a minimum mean square error (MMSE) technique.

7. The method of claim 5, wherein the deriving the spatial filter matrix comprises
forming the spatial filter matrix based on the overall channel response matrix and in accordance with a channel correlation matrix inversion (CCMI) technique.

8. The method of claim 1, further comprising:
forming a vector of received symbols for the 2-symbol interval, and
wherein the performing spatial processing on the received symbols comprises performing spatial processing on the vector of received symbols for the 2-symbol interval to obtain a vector of detected symbols for the 2-symbol interval.

9. The method of claim 1, wherein the deriving the spatial filter matrix comprises
forming the spatial filter matrix based on the effective channel response matrix and in accordance with a minimum mean square error (MMSE) technique.

10. The method of claim 1, wherein the deriving the spatial filter matrix comprises
forming the spatial filter matrix based on the effective channel response matrix and in accordance with a channel correlation matrix inversion (CCMI) technique.

11. The method of claim 1, wherein the performing spatial processing on the received symbols comprises
performing spatial processing on received symbols for each of at least two symbol periods with the spatial filter matrix to obtain detected symbols for the symbol period.

12. The method of claim 1, further comprising:
combining multiple detected symbols obtained for each data symbol sent with STTD.

13. The method of claim 1, further comprising:
performing maximal ratio combining of multiple detected symbols obtained for each data symbol sent with STTD.

14. The method of claim 1, further comprising:
performing post-processing on the detected symbols in accordance with an STTD encoding scheme used for the data transmission to obtain estimates of data symbols sent for the data transmission.

15. The method of claim 14, wherein the performing post-processing on the detected symbols comprises
conjugating the detected symbols, as needed, in accordance with the STTD scheme used for the data transmission.

16. The method of claim 14, further comprising:
demultiplexing the data symbol estimates onto one or more data symbol streams sent for the data transmission.

17. A method of receiving data in a wireless communication system, comprising:
obtaining received symbols for a data transmission comprising multiple data symbol streams with at least one data symbol stream being sent with space-time transmit diversity(STTD);
obtaining an effective channel response matrix for the data transmission; Deriving a spatial filter matrix with the effective channel response matrix; and
performing spatial processing on the received symbols, based on a 2-symbol interval corresponding to the received symbols, with the spatial filter matrix to obtain detected symbols for the plurality of data symbol streams.

18. The method of claim 17, wherein the obtaining the received symbols comprises
obtaining the received symbols for the data transmission comprising the multiple data symbol streams with at least one data symbol stream being sent with STTD and at least one data symbol stream being sent without STTD.

19. The method of claim 17, wherein the obtaining the received symbols comprises
obtaining the received symbols for the data transmission comprising the multiple data symbol streams with at least two data symbol streams being sent with STTD.

20. The method of claim 17, wherein the obtaining the effective channel response matrix comprises
estimating channel gains for each of the multiple data symbol streams at a plurality of receive antennas, and
forming the effective channel response matrix with the estimated channel gains for the multiple data symbol streams and the plurality of receive antennas.

21. The method of claim 17, wherein the performing spatial processing on the received symbols comprises
performing spatial processing on received symbols for each of at least two symbol periods with the spatial filter matrix to obtain detected symbols for the plurality of data symbol streams in the symbol period.

22. An apparatus in a wireless communication system, comprising:
at least one demodulator configured to obtain received symbols for a data transmission comprising at least one data symbol stream sent with space-time transmit diversity (STTD);
a channel estimator configured to obtain an effective channel response matrix for the data transmission;
a matched filter generator configured to derive a spatial filter matrix with the effective channel response matrix; and
a spatial processor configured to perform spatial processing on the received symbols; based on a 2-symbol interval corresponding to the received symbols, with the spatial filter matrix to obtain detected symbols.

23. The apparatus of claim 22, wherein the effective channel response matrix includes effects of spatial processing performed for the data transmission.

24. The apparatus of claim 22, wherein the matched filter generator is configured to form an overall channel response matrix based on the effective channel response matrix and in accordance with an STTD encoding scheme used for the data transmission.

25. The apparatus of claim 24, wherein the matched filter generator is configured to form the spatial filter matrix based on the overall channel response matrix and in accordance with a minimum mean square error (MMSE) technique or a channel correlation matrix inversion (CCMI) technique.

26. The apparatus of claim 22, wherein the spatial processor is configured to form a vector of received symbols for the 2-symbol interval and performs spatial processing on the vector of received symbols to obtain a vector of detected symbols for the 2-symbol interval.

27. The apparatus of claim 22, wherein the matched filter generator is configured to form the spatial filter matrix based on the effective channel response matrix and in accordance with a minimum mean square error (MMSE) technique or a channel correlation matrix inversion (CCMI) technique.

28. The apparatus of claim 22, wherein the spatial processor is configured to perform spatial processing on received symbols for each of at least two symbol periods with the spatial filter matrix to obtain detected symbols for the symbol period.

29. The apparatus of claim 22, further comprising:
a combiner configured to combine multiple detected symbols obtained for each data symbol sent with STTD.

30. The apparatus of claim 22, further comprising:
a post-processor to configured to perform post-processing on the detected symbols in accordance with an STTD encoding scheme used for the data transmission to obtain estimates of data symbols sent for the data transmission.

31. An apparatus in a wireless communication system, comprising:
means for obtaining received symbols for a data transmission comprising at least one data symbol stream sent with space-time transmit diversity (STTD);
means for obtaining an effective channel response matrix for the data transmission;
means for deriving a spatial filter matrix with the effective channel response matrix; and
means for performing spatial processing on the received symbols, based on a 2-symbol interval corresponding to the received symbols, with the spatial filter matrix to obtain detected symbols.

32. The apparatus of claim 31, further comprising:
means for forming an overall channel response matrix based on the effective channel response matrix and in accordance with an STTD encoding scheme used for the data transmission.

33. The apparatus of claim 32, wherein the means for deriving the spatial filter matrix comprises
means for forming the spatial filter matrix based on the overall channel response matrix and in accordance with a minimum mean square error (MMSE) technique or a channel correlation matrix inversion (CCMI) technique.

34. The apparatus of claim 31, further comprising:
means for forming a vector of received symbols for the 2-symbol interval, and
wherein the means for performing spatial processing on the received symbols comprises means for performing spatial processing on the vector of received symbols for the 2-symbol interval to obtain a vector of detected symbols for the 2-symbol interval.

35. The apparatus of claim 31, wherein the means for deriving the spatial filter matrix comprises
means for forming the spatial filter matrix based on the effective channel response matrix and in accordance with a minimum mean square error (MMSE) technique or a channel correlation matrix inversion (CCMI) technique.

36. The apparatus of claim 31, wherein means for performing spatial processing comprises
means for performing spatial processing on received symbols for each of at least two symbol periods with the spatial filter matrix to obtain detected symbols for the symbol period.

37. The apparatus of claim 31, further comprising:
means for combining multiple detected symbols obtained for each data symbol sent with STTD.

38. A method of receiving data in a wireless communication system, comprising:
obtaining received symbols for a data transmission comprising at least one data symbol stream sent with space-time transmit diversity (STTD);
obtaining an effective channel response matrix for the data transmission;
forming an overall channel response matrix in accordance with an STTD encoding scheme used for the data transmission;
deriving a spatial filter matrix based on the overall channel response matrix;
forming a vector of received symbols for a 2-symbol interval; and
performing spatial processing on the vector of received symbols for the 2-symbol interval with the spatial filter matrix to obtain a vector of detected symbols for the 2-symbol interval.

39. The method of claim 38, wherein the deriving the spatial filter matrix comprises;
forming the spatial filter matrix based on the overall channel response matrix and in accordance with a minimum mean square error (MMSL) technique or a channel correlation matrix inversion (CCMI) technique.

40. A method of receiving data in a wireless communication system, comprising:
obtaining received symbols for a data transmission comprising at least one data symbol stream sent with space-time transmit diversity (STTD);
obtaining an effective channel response matrix for the data transmission;
deriving a spatial filter matrix based on the effective channel response matrix;
performing spatial processing on the received symbols, based on a 2-symbol interval corresponding to the received symbols, for each of at least two symbol periods with the spatial filter matrix to obtain detected symbols for the symbol period; and
combining multiple detected symbols obtained for each data symbol sent with STTD.

41. The method of claim 40, wherein the deriving the spatial filter matrix comprises
forming the spatial filter matrix based on the effective channel response matrix and in accordance with a minimum mean square error (MMSL) technique or a channel correlation matrix inversion (CCMI) technique.

42. A method of receiving data in a wireless communication system, comprising:
obtaining received symbols for a data transmission sent with space-time transmit diversity (STTD), space-frequency transmit diversity (SFTD), or orthogonal transmit diversity (OTD) for at least one data symbol stream and with spatial spreading for all data symbol streams in the data transmission;
obtaining an effective channel response matrix for the data transmission and including effects of the spatial spreading;

deriving a spatial filter matrix with the effective channel response matrix; and performing spatial processing on the received symbols, based on a 2-symbol interval corresponding to the received symbols, with the spatial filter matrix to obtain detected symbols.

43. The method of claim 42, further comprising:
forming a vector of received symbols for the 2-symbol interval, and
wherein the performing spatial processing on the received symbols comprises performing spatial processing on the vector of received symbols for the 2-symbol interval with the spatial filter matrix to obtain a vector of detected symbols for the 2-symbol interval.

44. A method of receiving data in a wireless communication system, comprising:
obtaining received symbols for a data transmission sent with space-time transmit diversity (STTD), space-frequency transmit diversity (SFTD), or orthogonal transmit diversity (OTD) for at least one data symbol stream and with spatial spreading for all data symbol streams in the data transmission;
obtaining an effective channel response matrix for the data transmission and including effects of the spatial spreading;
deriving a spatial filter matrix with the effective channel response matrix;
performing spatial processing on the received symbols with the spatial filter matrix to obtain detected symbols; and
forming a vector of received symbols for each pair of frequency subbands;
wherein the performing spatial processing on the received symbols comprises performing spatial processing on the vector of received symbols for the pair of frequency subbands with the spatial filter matrix to obtain a vector of detected symbols for the pair of frequency subbands.

45. The method of claim 42, wherein the performing spatial processing on the received symbols comprises performing spatial processing on received symbols for each of at least two symbol periods with the spatial filter matrix to obtain detected symbols for the symbol period.

46. The method of claim 42, wherein the deriving the spatial filter matrix comprises;
forming the spatial filter matrix with the effective channel response matrix and in accordance with a minimum mean square error (MMSE) technique or a channel correlation matrix inversion (CCMI) technique.

47. An apparatus in a wireless communication system, comprising:
at least one demodulator configured to obtain received symbols for a data transmission sent with space-time transmit diversity (STTD), space-frequency transmit diversity (SFTD), or orthogonal transmit diversity (OTD) for at least one data symbol stream and with spatial spreading for all data symbol streams in the data transmission;
a channel estimator configured to obtain an effective channel response matrix for the data transmission and including effects of the spatial spreading;
a matched filter generator configured to derive a spatial filter matrix with the effective channel response matrix; and
a spatial processor configured to perform spatial processing on the received symbols; based on a 2-symbol interval corresponding to the received symbols, with the spatial filter matrix to obtain detected symbols.

48. The apparatus of claim 47, wherein the spatial processor is configured to form a vector of received symbols for the 2-symbol interval and performs spatial processing on the vector of received symbols for the 2-symbol interval with the spatial filter matrix to obtain a vector of detected symbols for the 2-symbol interval.

49. The apparatus of claim 47, wherein the spatial processor is configured to perform spatial processing on received symbols for each of at least two symbol periods with the spatial filter matrix to obtain detected symbols for the symbol period.

50. An apparatus in a wireless communication system, comprising:
means for obtaining received symbols for a data transmission sent with space-time transmit diversity (STTD), space-frequency transmit diversity (SFTD), or orthogonal transmit diversity (OTD) for at least one data symbol stream and with spatial spreading for all data symbol streams in the data transmission;
means for obtaining an effective channel response matrix for the data transmission and including effects of the spatial spreading;
means for deriving a spatial filter matrix with the effective channel response matrix; and
means for performing spatial processing on the received symbols, based on a 2-symbol interval corresponding to the received symbols, with the spatial filter matrix to obtain detected symbols.

51. The apparatus of claim 50, further comprising:
means for forming a vector of received symbols for 2-symbol interval, and
wherein the means for performing spatial processing on the received symbols comprises means for performing spatial processing on the vector of received symbols for the 2-symbol interval with the spatial filter matrix to obtain a vector of detected symbols for the 2-symbol interval 52. The apparatus of claim 50, wherein the means for performing spatial processing on the received symbols comprises means for performing spatial processing on received symbols for each of at least two symbol periods with the spatial filter matrix to obtain detected symbols for the symbol period.

* * * * *